United States Patent
Neyts et al.

(10) Patent No.: US 12,535,712 B2
(45) Date of Patent: Jan. 27, 2026

(54) SMART WINDOWS BASED ON ELECTROPHORESIS OF SCATTERING PARTICLES

(71) Applicant: UNIVERSITEIT GENT, Ghent (BE)

(72) Inventors: Kristiaan Neyts, Ghent (BE); Filip Beunis, Ghent (BE); Mohammadreza Bahrami, Ghent (BE)

(73) Assignee: UNIVERSITEIT GENT, Ghent (BE)

( * ) Notice: Subject to any disclaimer, the term of this patent is extended or adjusted under 35 U.S.C. 154(b) by 717 days.

(21) Appl. No.: 17/925,365

(22) PCT Filed: May 12, 2021

(86) PCT No.: PCT/EP2021/062562
§ 371 (c)(1),
(2) Date: Nov. 15, 2022

(87) PCT Pub. No.: WO2021/228907
PCT Pub. Date: Nov. 18, 2021

(65) Prior Publication Data
US 2023/0194946 A1    Jun. 22, 2023

(30) Foreign Application Priority Data
May 15, 2020   (EP) .................................. 20174952

(51) Int. Cl.
*G02F 1/167*      (2019.01)
*E06B 9/24*       (2006.01)
(Continued)

(52) U.S. Cl.
CPC ............... *G02F 1/167* (2013.01); *E06B 9/24* (2013.01); *G02F 1/0063* (2013.01);
(Continued)

(58) Field of Classification Search
CPC ...... G02F 1/167; G02F 1/1685; G02F 1/1676; G02F 1/0063; E06B 9/24; E06B 2009/2464
(Continued)

(56) References Cited

U.S. PATENT DOCUMENTS

| | | |
|---|---|---|
| 8,629,833 B1 | 1/2014 | Campisi et al. |
| 2005/0185104 A1 | 8/2005 | Weisbuch et al. |
| 2007/0205671 A1* | 9/2007 | Chikazawa ............ G02B 5/005 307/134 |

FOREIGN PATENT DOCUMENTS

| | | |
|---|---|---|
| EP | 1830345 A1 | 9/2007 |
| JP | 2004061833 A | 2/2004 |

OTHER PUBLICATIONS

Search Report from European Application No. 20174952.0, Sep. 30, 2020.
(Continued)

*Primary Examiner* — Balram T Parbadia
*Assistant Examiner* — Mitchell T Oestreich
(74) *Attorney, Agent, or Firm* — Workman Nydegger

(57) ABSTRACT

A switchable optical element, a smart window having the same, and a method for switching between optical states of the element such that the optical element includes a pair of substrates disposed facing each other, and at least one cell arranged between the pair of substrates and filled with scattering particles. An electrode configuration is provided on the pair of substrates such that a first group of cell electrodes is interleaved with electrodes of a second group of cell electrodes on a face of a first substrate, and a third group of cell electrodes is interleaved with electrodes of a fourth group of cell electrodes on a face of a second substrate. Switching of the cell includes laterally transporting over at least a distance corresponding to two adjacent
(Continued)

cell electrodes of one same cell electrode group and confining the scattering particles to a confinement region within the cell.

20 Claims, 9 Drawing Sheets

(51) Int. Cl.
    *G02F 1/00*         (2006.01)
    *G02F 1/1676*    (2019.01)
    *G02F 1/1685*    (2019.01)

(52) U.S. Cl.
    CPC .......... *G02F 1/1676* (2019.01); *G02F 1/1685* (2019.01); *E06B 2009/2464* (2013.01)

(58) Field of Classification Search
    USPC ........................................................ 359/296
    See application file for complete search history.

(56) References Cited

OTHER PUBLICATIONS

International Search Report from PCT Application No. PCT/EP2021/062562, Jul. 22, 2021.

\* cited by examiner

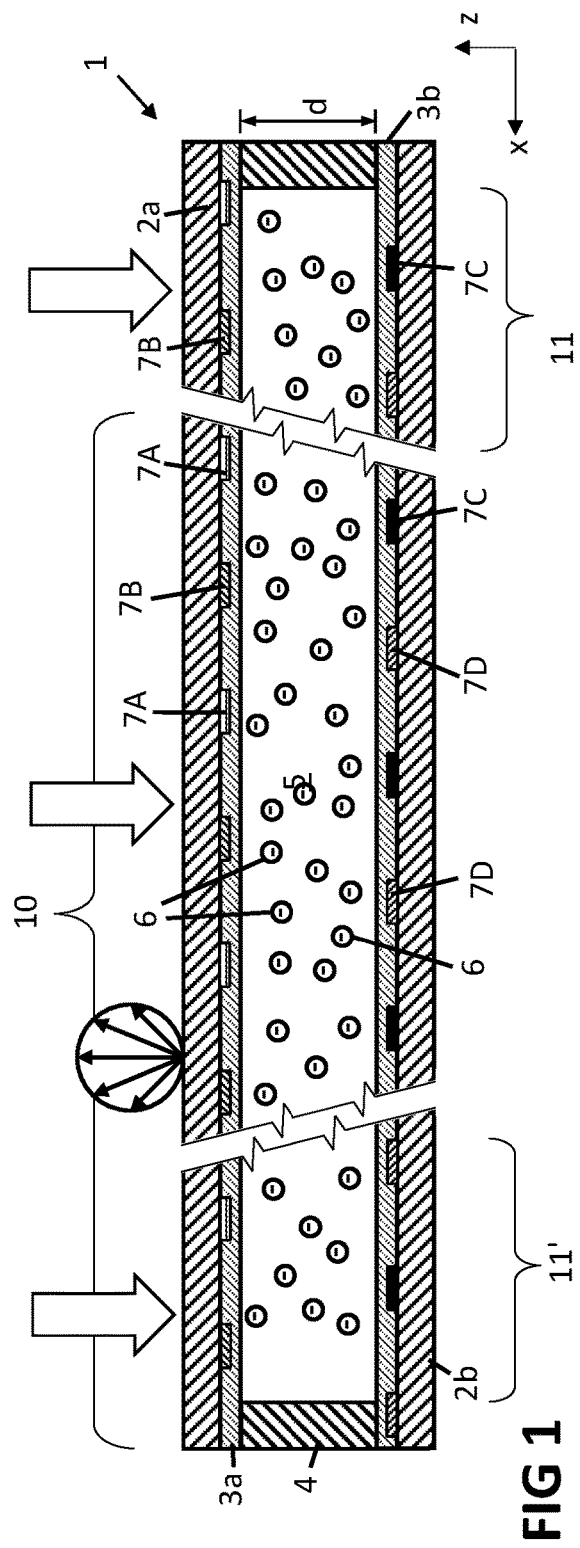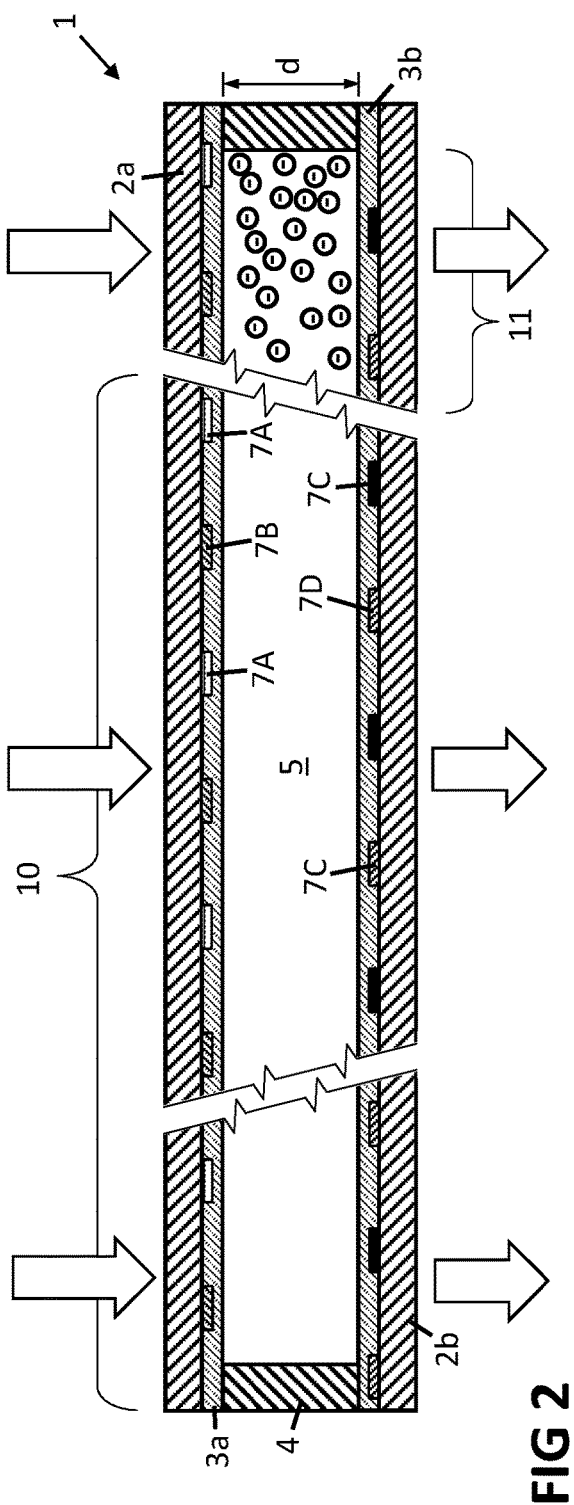
FIG 1
FIG 2

Configuration I

Configuration II

Configuration III

FIG. 12(a)
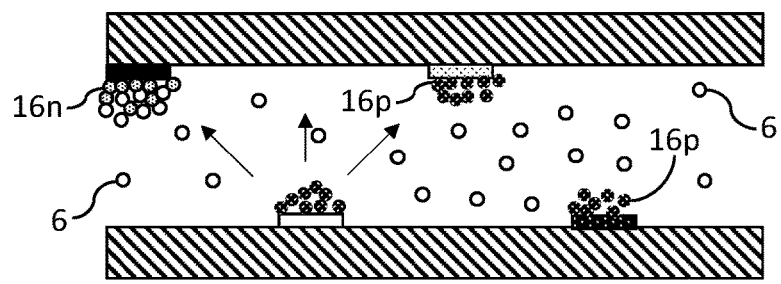
FIG. 12 (b)
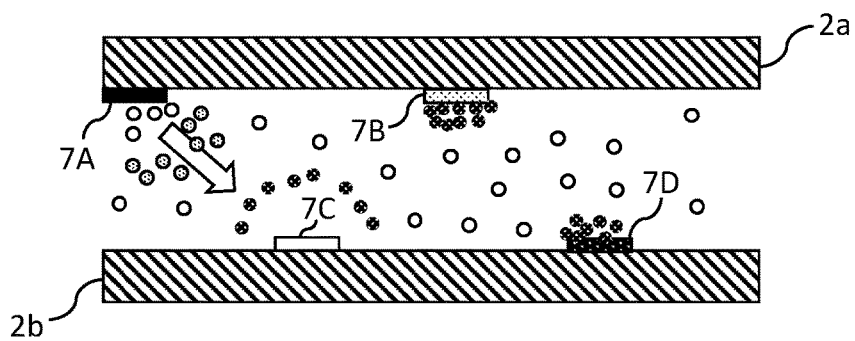
FIG. 12(c)
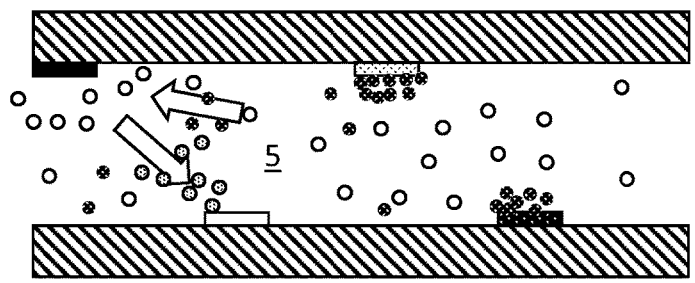
FIG. 12(d)
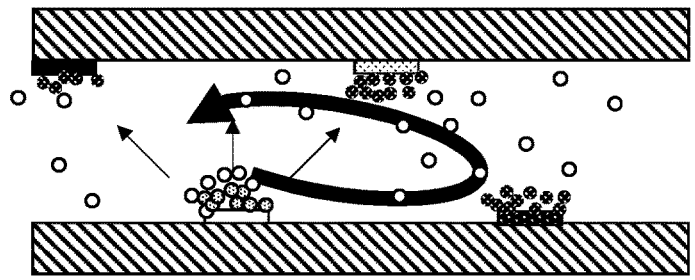
FIG. 12(e)
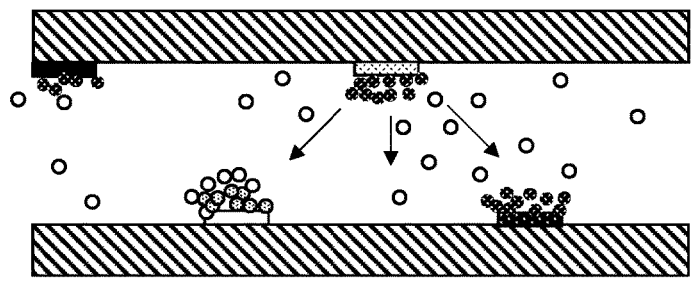
FIG 12

SMART WINDOWS BASED ON ELECTROPHORESIS OF SCATTERING PARTICLES

FIELD OF THE INVENTION

The invention relates to the field of light transmission control through optical media, and in particular to the managing of the amount of sunlight that is transmitted through windows.

BACKGROUND OF THE INVENTION

Known means to manage the amount of sunlight entering a room through windows include window blinds, such as Persian blinds, Venetian blinds, or vertical blinds, window shades, window shutters and curtains. These devices are installed in addition to the existing windows, are often operated manually or by motor, and tend to accumulate dust and dirt which are not easily removable by cleaning. Motor-driven devices often have a limited operation speed, e.g. switching from a closed shutter to an open shutter can take up to ten seconds. Due to their mechanical structure, these known devices are also more prone to defects or blockage. Moreover, a temperature reduction of the room behind windows equipped with these devices requires blocking of the sunlight. This has the disadvantage that room illumination on hot days is often insufficient and additional room lighting is needed.

Layer stacks with metallic coatings are also known in prior art windows and are frequently encountered in commercial buildings to reflect infrared light. The metallic coatings have the disadvantage of absorbing important amounts of heat, which is then entering the building via heat transport, e.g. heat conduction or convection. Moreover, the metal coatings are creating colored reflections and transmissions through the window, which may be perceived as disturbing by some users. The reflection of infrared light is permanent.

The Eyrise™ LC (liquid crystal) cell developed by Merck KGaA comprises a cholesteric LC mixture. A transparent window can be switched into an opaque panel by re-orienting the liquid crystal molecules. Adopting a random position, the liquid crystal molecules cause increased light scatter and the window transitions into a translucent state. The light scattering is mainly in the forward direction and most infrared light is not reflected. Moreover, the LC cell requires continuous driving, which increases the power dissipation of a switchable window using this cell.

SUMMARY OF THE INVENTION

It is an object of embodiments of the present invention to provide optical articles and switching methods for use in smart windows that are easy to install and which can switch between a first optical state for which the optical article is reflecting visible and short infrared sunlight efficiently and a second optical state for which the optical article is transparent to the sunlight.

It is a further objective of embodiments of the present invention to provide optical articles for use in smart windows to reflect short infrared sunlight more efficiently without absorbing heat.

It is a further objective of embodiments of the present invention to provide optical articles for use in smart windows, which do not require continuous driving.

The above objective is accomplished by methods and devices according to the present invention.

In a first aspect, the present invention relates to a switchable optical element for use in a smart window, for instance smart windows in building applications. The optical element comprises a pair of substrates which are disposed facing each other and which separated from each other, e.g. by a gap. At least one cell is arranged between the pair of substrates and extends laterally between the pair of substrates. The cell includes a dispersion of charged scattering particles, e.g. the scattering particle dispersion is filling the cell volume and the gap between the pair of substrates. A cell electrode configuration is provided on the pair of substrates and is organized into groups of cell electrodes. Cell electrodes of a first group are interleaved with cell electrodes of a second group on a face of a first one of the pair of substrates, and cell electrodes of a third group are interleaved with cell electrodes of a fourth group on a face of a second one of the pair of substrates. The cell electrode configuration on the pair of substrates defines a transport region and a confinement region in each cell, wherein the transport region is contiguous with the confinement region. The at least one cell is switchable between a first optical state and a second optical state. Here, the first optical state is associated with a light-scattering, distributed configuration of the scattering particles within the transport and confinement region of the at least one cell, whereas the second optical state is associated with a non-scattering, confined configuration of the scattering particles within the confinement region of the at least one cell. Moreover, a relative arrangement between the cell electrodes of the first and second group on the first substrate relative to the cell electrodes of the third and fourth group on the second substrate is adapted for inducing lateral transport conditions for the scattering particles in the at least one cell, from the transport region towards the confinement region, when control signals for switching of the at least one cell between the two optical states are received by the electrode configuration. The transport region of the at least one cell and the therein induced lateral transport of the charged scattering particles extend over at least a distance that corresponds to two adjacent cell electrodes of one same group of the groups of cell electrodes in the lateral transport direction of the cell.

In embodiments of the invention, a lateral extent of the transport region may differ from a lateral extent of the confinement region by at least one order of magnitude. The lateral extent of the confinement region may correspond to four to twenty successive cell electrodes in the lateral direction of the cell. The confinement region of the at least one cell may correspond to a lateral confinement region, which extends between the transport region and a lateral boundary of the cell, or a limited portion thereof.

In embodiments of the invention, the electrode configuration may be adapted for inducing lateral transport conditions for the scattering particles in the cell, for instance by laterally transporting the scattering particles towards a confinement region of the cell, and by confining the scattering particles to the confinement region, when control signals for switching of the cell to the second optical state are applied to the cell electrode configuration. The confinement region may be a lateral or central region of the cell, into which the scattering particles are directed via electrophoresis and in which the laterally transported scattering particles are concentrated after the lateral transport has been completed. The electrode configuration may further be adapted for inducing lateral transport conditions for the scattering particles in the cell, for instance by laterally transporting the scattering particles from the confinement region towards a transport region of the cell, when control signals for switching of the cell to the second optical state are applied to the cell electrode configuration. The transport region is contiguous with the confinement region. The electrode configuration may further be adapted for inducing spreading conditions in the cell, for spreading laterally transported scattering particles over the whole cell, when switching the cell to the first optical state.

The dispersion of scattering particles efficiently scatters incident solar light, in particular short-infrared solar light passing into the cell volume is efficiently backscattered into the environment. This limits the solar light induced heating of a space located behind the optical element (e.g. room behind a smart window). The scattering particles can be efficiently displaced by electrophoresis when switching between the first and the second optical state. The control signals are applied to laterally transport the charged scattering particles within the cell volume, and to confine them in a confinement region in the non-scattering, clear state. Hence, no continuous driving of the electrode configuration is necessary once the switching has been completed. Rectification of the distributed and/or the confined scattering particle distribution in the cell can be performed occasionally or regularly at time intervals that are much larger as compared to the time necessary for switching or rectification.

According to embodiments of the invention, at least one of the pair of substrates may be made from a sheet of glass or from a transparent polymer film. The substrate materials and optical properties can be selected to achieve good transmission at visible wavelengths, good weather resistance, flexible optical elements.

According to embodiments of the invention, the scattering particles are dispersed in a liquid continuous phase comprising a non-polar solvent and/or surfactants. Non-polar solvents have the advantage of being associated with a low dielectric constant, which lowers the capacitive losses of the optical element and decreases the switching times. Additionally, an electric field at the locations of the individual scattering particles is enhanced. Surfactants may be added to achieve better charge-transfer control to the dispersed scattering particles and to stabilize the dispersion at the same time. The scattering particles may be based on white pigment materials; they may have an associated refractive index larger than the a refractive index of the solvent to yield higher scattering cross-sections.

According to particular embodiments of the invention, the optical element may further comprises a dispersion of charged absorbing particles in one or several of its cells. For such embodiments, the cells including the absorbing particles can be switched also between a third optical state and a fourth optical state. The third optical state is associated with a light-absorbing, distributed configuration of the absorbing particles within the cell(s), and the fourth optical state is associated with a non-absorbing, confined configuration of the absorbing particles within the cell(s). Furthermore, the electrode configuration is adapted for inducing lateral transport conditions for the absorbing particles in the cells comprising the absorbing particles, when control signals for switching between the third and the fourth optical state are received by the electrode configuration. The presence of a further species of dispersed charged particles, which has light absorbing properties, has the further advantage, that the optical transmittance of the optical element can be controlled more accurately, e.g. different shadings can be set.

According to embodiments of the invention, the cell electrodes may be patterned in at least one of the group of a metal oxide based material, an aluminum based material and an organic conductive polymer based material. Metallic electrodes generally have better conductivity and thus less resistive losses, whereas metal oxide-based or organic conductive polymer-based electrode material can be transparent at visible wavelengths, which has the advantage that the observer will not perceive the electrode configuration as unpleasant.

According to embodiments of the invention, electrodes of a same group of cell electrodes may be connected to a common bus bar to facilitate the delivery and distribution of control signals to the individual cell electrodes. In addition thereto, electrodes of the first and second group and/or electrodes of the third and fourth group of cell electrodes may be provided as a plurality of interdigitated electrode fingers, which can be manufactured more easily over larger surface areas of the optical element, or smart window comprising the optical element.

In a further aspect, the invention relates to a method for switching the at least one cell of an optical element, according to embodiments of the first aspect, from the first optical state to the second optical state. The method comprises delivering at least one driving pulse to each group of cell electrodes in only one of the following orders:
  a) first group of cell electrodes, third group of cell electrodes, second group of cell electrodes, fourth group of cell electrodes,
  b) first group of cell electrodes, second group of cell electrodes, third group of cell electrodes, fourth group of cell electrodes,
  c) any cyclic permutation and/or relabeling of cell electrode groups derivable from the two previous orders a) or b).

Moreover, the previous step is repeated a predetermined number of times to laterally transport the scattering particles towards the confinement region of the cell, and the so transported scattering particles in this confinement region.

In yet a further aspect, the invention relates to a switching the at least one cell of an optical element, according to embodiments of the first aspect, from the second optical state to the first optical state. This method comprises delivering, in a first stage, at least one driving pulse to each group of cell electrodes in only one of the following orders:
  a) first group of cell electrodes, fourth group of cell electrodes, second group of cell electrodes, third group of cell electrodes,
  b) first group of cell electrodes, fourth group of cell electrodes, third group of cell electrodes, second group of cell electrodes,
  c) any cyclic permutation and/or relabeling of cell electrode groups derivable from the two preceding orders a) or b).

This step is repeated a predetermined number of times to laterally transport at least a fraction of the scattering particles out of the confinement region of the cell, and away from the confinement region of the cell. Further, in a second stage, a driving pulse is simultaneously delivered to each electrode located on a first one of the pair of substrates, and a subsequent driving pulse to each electrode located on a second one of the pair of substrates. This further spreads the scattering particles over the at least one cell. Herein, driving pulses delivered in the second stage are of shorter pulse duration as compared to the driving pulses delivered in the first stage. Optionally, the step relating to the second stage is repeated a predetermined number of times.

In switching methods in accordance with some embodiments of the invention, the scattering particles of the switchable optical element are dispersed in a liquid continuous phase which comprises a non-polar solvent and surfactants. The surfactant molecules are provided at or above the critical inverse micelle concentration in the non-polar solvent. Charged inverse micelles that spontaneously form in the liquid continuous phase have a higher electrophoretic mobility than the charged scattering particles. According to the present switching method, an amplitude of each delivered pulse is selected to generate, via a collective viscous flow of charged inverse micelles moving in response to an electrophoretic force associated with the delivered pulse, a plurality of electrohydrodynamic fluid vortices in the at least one cell. The fluid vortices cause a backward component of the lateral transport of scattering particles in addition to, and superimposing, a forward component of the lateral transport of scattering particles by electrophoresis.

The present invention also relates to smart windows comprising the optical element according to embodiments of the first aspect.

In embodiments of the invention, the smart window or the optical element may further comprise a driving unit for driving the electrode configuration of the optical element. Such a driving unit may be configured for carrying out the steps of the switching methods described above.

In embodiments of the invention, a patterned shielding layer may be provided on at least one of the pair of substrates to cover and hide from view the confinement region of the cell.

It is an advantage of embodiments of the invention that a low solar energy transmission can be achieved for buildings with smart windows, which is particularly of interest in places with a hot and dry climate.

It is a further advantage of embodiments of the invention to provide optical elements or smart windows which do not rely on substrates that are intrinsically colored. A color tone may be perceived as aesthetically unpleasant by some users but not by others.

It is an advantage of embodiments of the invention over conventional metallic, e.g. silver film-based, window coatings or screens that the optical element is environmentally stable. No special care is required during installation of smart windows comprising the optical element. The reflection of solar energy by means of metallic window coatings or screens always causes an additional heat transfer into an indoor space by radiative or convective transfer of the absorbed fraction of solar incident energy.

It is an advantage of embodiments of the invention to provide optical elements or smart windows which can change their appearance dynamically and at fast speeds, e.g. switching times of the order of one second can be achieved.

It is an advantage of embodiments of the invention to provide switchable optical elements or smart windows for which the reflection of solar short-infrared radiation is outweighing the absorption of heat. This prevents the smart windows from being heated and additionally from conducting and re-radiating heat into a room located at an interior side behind the window. As a result, the room remains at a moderate temperature, and a greenhouse effect is avoided, yet enough light is still transmitted into the room to avoid the need for extra room lighting.

It is a further advantage of embodiments of the invention to provide lightweight and compact switchable optical elements or smart windows which are free of additionally installed mechanical parts, such as external blinds, which are bulky, fragile, or prone to mechanical malfunctioning or blockage, and for which cleaning is a delicate matter.

It is a further advantage of embodiments of the invention to provide users with smart windows for which a switching action between two or more states is done automatically upon user input confirmation or by programming. No manual intervention is needed to switch the smart windows from one state to another state.

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, in which:

FIG. 1 and FIG. 2 are cross-sectional views of a switchable optical element according to an embodiment of the invention, switched to a first optical state and to a second optical state, respectively.

FIG. 12, including FIGS. 12(a) to 12(e), explains, through a series of partial cross-sectional views of a switchable optical element, the emergence of lateral transport conditions that comprise a forward and a backward component for the lateral displacement of scattering particles, which may be observed and exploited in some embodiments of the invention.

Figure 3:
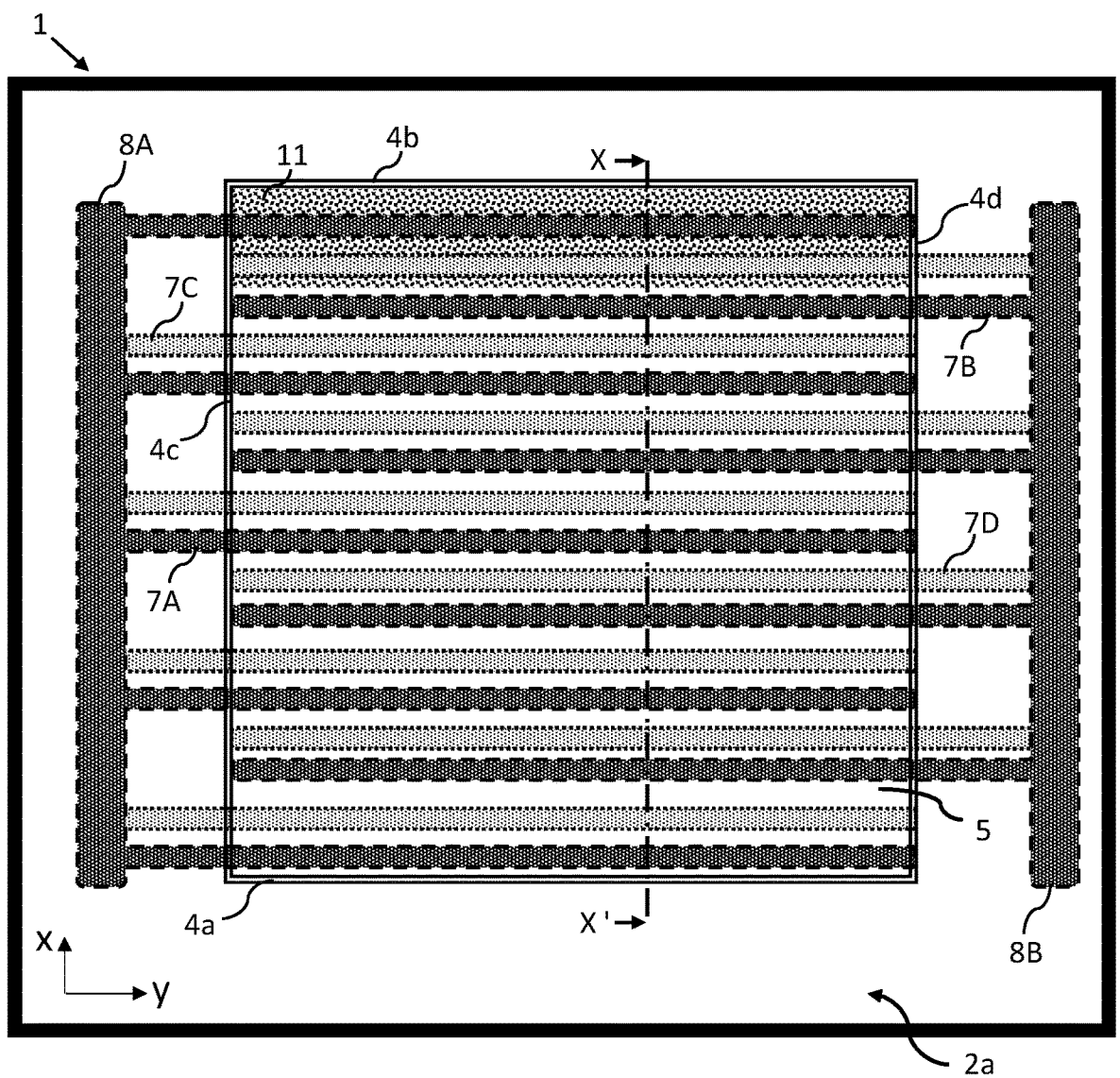
FIG. 3 is a top view of the switchable optical element corresponding to the cross-sectional views of FIG. 1 and FIG. 2.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, directional terminology such as top, bottom, front, back, leading, trailing, under, over and the like in the description and the claims is used for descriptive purposes with reference to the orientation of the drawings being described, and not necessarily for describing relative positions. Because components of embodiments of the present invention can be positioned in a number of different orientations, the directional terminology is used for purposes of illustration only, and is in no way intended to be limiting, unless otherwise indicated. It is, hence, to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art.

In the description provided herein, numerous specific details are set forth. However, it is understood that embodiments of the invention may be practiced without these specific details. In other instances, well-known methods, structures and techniques have not been shown in detail in order not to obscure an understanding of this description.

When in the description reference is made to optical properties such as reflectance, transmittance, absorption, scattering (efficiency), as well as optical states involving these properties, these properties generally refer to wavelengths ranging in the visible and short IR spectrum, e.g. ranging between 350 nanometer and 3 micrometer approximately. Likewise, radiation, sunlight and solar irradiance, in the context of the present invention, are generally assessed in that range, unless stated otherwise.

In the context of the present invention, the term solar energy transmission/transmittance refers to the portion of the incident solar radiant energy (incident onto the outdoor face of the switchable optical element or smart window comprising the same) that is directly transmitted indoors. A re-radiated, conductive or convective component of solar energy transfer is often smaller as compared to the directly transmitted portion. Therefore, the solar energy transmission of embodiments of the invention can be determined as the spectral average of the directly transmitted solar radiant energy and measured through a hemispherical integration of the forward transmission of light. Here forward transmission is understood to include both specular and scattering components. The optical absorbance, transmittance and heat transfer contributions of the window frame are not included in the solar energy transmission/transmittance referred to in embodiments of the invention. A small absorbed portion of solar radiant energy may be taken into account for embodiments using tinted glass.

In the detailed description hereinbelow, cell electrodes generally refer to elongated conductive traces or paths that are provided on the pair of substrates. Their transverse dimensions, perpendicular to the tangent vector at each point of the conductive path, are much smaller than the elongation (i.e. arc length) of the electrode's conductive path. The conductive paths of the cell electrodes may be straight paths, or may be curved paths. A lateral transport direction for the scattering particles is parallel to the pair of substrates and perpendicular to the tangent vectors of adjacent cell electrodes. Adjacent cell electrodes may be located on opposite substrates of the pair of substrates if the separation of their projections onto a same substrate is smaller than the separation between two consecutive cell electrodes located on the same substrate. A lateral transport direction may not be uniform and constant across the whole cell volume. A distance between adjacent cell electrodes may be increased or decreased locally (applying only to a portion of the cell) to change the transport velocity of the charged scattering particles and/or a direction of the cell electrodes, i.e. as indicated by the tangent vector, may vary locally, e.g. to obtain a better or more flexible, e.g. two-dimensional, control over the transport of charged scattering particles. In a first aspect, the invention is directed to a switchable optical element.

An embodiment of the invention will be described with reference to FIGS. 1 to 3, wherein FIG. 3 is a top view of a switchable optical element 1 and FIG. 1, FIG. 2 are cross-sectional views of the same switchable optical element 1 along the line X-X' in FIG. 3, but illustrating different switched states thereof.

Optical element 1 includes at least one cell 5 with a cell volume. The cell 5 is typically a flat cell with lateral dimensions ("x" and "y") much greater than a height dimension ("z"), e.g. the lateral sizes of the cell are larger than a cell thickness "d". For instance, lateral dimensions of the cell 5 may be 1*1 cm$^2$ or larger, e.g. 1*10 cm$^2$, 1*100 cm$^2$, 10*10 cm$^2$, or 10*100 cm$^2$, whereas the cell thickness may range between 50 micrometer and 100 micrometer. A pair of substrates 2a, 2b is disposed facing each other and separated from each other by a distance, d, so as to include the at least one cell 5 therebetween. A first substrate 2a of the pair and a second substrate 2b of the pair are arranged at a top side, respectively at a bottom side of the optical element 1, and delimit the volume of the cell 5 in a vertical direction. Moreover, a lateral boundary 4 delimits the volume of the cell 5 in a lateral direction "y", e.g. along a horizontal direction of a smart window pane comprising the optical element 1. It is a function of the lateral boundary 4 to define the volume and geometry of the cell 5 and also to contain a dispersion of scattering particles 6 within the volume of the at least one cell 5. It is a further function of the lateral boundary 4 to support the upper first substrate 2a on the lower second substrate 2b, and to maintain a minimum distance between them such that they do not make contact or stick together.

The first substrate 2a may correspond to a light-receiving face of the optical element 1, e.g. the first substrate 2a may correspond to an outward-oriented face of a smart window pane installed in a building and comprising the optical element 1. Consequently, the second substrate 2b may correspond to a light-transmitting face of the optical element 1, e.g. the second substrate 2a may correspond to an inward-oriented face of a smart window pane installed in a building and comprising the optical element 1. However, embodiments of the invention are not limited to this particular orientation of the pair of substrates with respect to a source of light, typically the sun, and the orientation of the first and second substrate 2a, 2b may be reversed.

The optical element 1 further comprises a plurality of cell electrodes which are provided on a respective face of each substrate of the pair of substrates 2a, 2b. The plurality of cell electrodes are organized into four independent groups of cell electrodes 7A-7D, each group of cell electrodes being adapted for receiving a sequence of electrical control signals, e.g. voltage pulses, that induce switching of the optical element 1 form a first optical state to a second optical state. In the following description, the first optical state refers to a light scattering state, e.g. an optical state in which a portion of the light received is being transmitted, but is significantly scattered at the same time thus increasing opaqueness and haze, and the second optical state refers to a non-scattering state, e.g. a clear state in which a larger portion of the light received is being transmitted without undergoing significant scattering thus reducing or eliminating opaqueness and haze. A first group of cell electrodes 7A and a second group of cell electrodes 7B are provided on a face of the first substrate 2a in an alternating fashion, i.e. cell electrodes of the first group 7A are interleaved with cell electrodes of the second group 7B. Likewise, a third group of cell electrodes 7C and a fourth group of cell electrodes 7D are provided on a face of the second substrate 2b in an alternating fashion, i.e. cell electrodes of the third group 7C are interleaved with cell electrodes of the fourth group 7D.

The cell electrodes of a same group may be arranged on a face of one of the substrates 2a, 2b such that they are regularly spaced. A regularly spaced pattern of cell electrodes is advantageous because the accurate manufacturing of such regular pattern is often easier to achieve over large areas. Is also simplifies the respective alignment between the cell electrodes belonging to two different groups since this alignment can be performed and verified for only a limited number of alignment locations, e.g. via alignment markers located at the four corners of the cell 5 or by aligning the regular stripe patterns at two diagonally opposite points on or near the periphery (e.g. lateral boundary) of the cell 5.

Each of the respective faces of the first and the second substrate 2a, 2b on which the groups of cell electrodes 7A, 7B and 7C, 7D are provided may correspond to an inner face of that substrate, e.g. the substrate face that is closest to, or in direct contact with, the volume of the cell 5, or may correspond to an outer face of that substrate, e.g. the substrate face that is more distant to, and spaced apart from, the volume of the cell 5. Alternatively, each of the respective faces of the first and the second substrate 2a, 2b on which the groups of cell electrodes 7A, 7B and 7C, 7D are provided may correspond to a different side of that substrate relative to the volume of the cell, e.g. the face of the first substrate 2a on which the first and second group of cell electrodes 7A, 7B are formed may correspond to the inner face of the first substrate 2a, whereas the face of the second substrate 2b on which the third and fourth group of cell electrodes 7C, 7D are formed may correspond to the outer face of the second substrate 2b, or vice versa.

The cell electrodes of each group may be formed as finger electrodes, e.g. as elongated electrodes having a length dimension (e.g. direction "y" in FIG. 3) substantially larger than each dimension in the cross-section (e.g. directions "x"

and "z" in FIG. 1 and FIG. 2). Elongated electrodes may comprise an elongated electrode body whose longitudinal direction (of elongation) is not constant and may be piecewise constant, arcuate or curvilinear. Straight finger electrodes are an examples of elongated electrodes of constant longitudinal direction, whereas segmented electrodes comprising straight electrode segments joined at non-zero angles (e.g. zig-zagging or sawtooth profile) are an example of elongated electrodes with piecewise constant longitudinal direction. Moreover, the cell electrodes of each group may be formed as electrode strips, for example as shown in FIG. 3, in which the cell electrodes of each group 7A-7D are provided as straight strips. Although strip-like cell electrodes are preferred for their reduced resistance and associated RC time constant, embodiments of the present invention are not limited thereto. For instance, thicker rib-like metallic cell electrodes may be provided for which the ribbed structure can result in improved conductivity and cooling properties of the cell electrodes. Additionally or alternatively, the cell electrodes of each group may deviate from a straight line shape as long as they remain separated to not contact one another. For example, the cell electrodes of each group may exhibit a sawtooth-like, zig-zagging, meandering, sinusoidal, or wiggling profile along length direction.

The cell electrode structure may be formed on an inward or outward face of the substrate by known techniques, including thin film deposition, lithography and etching/lift-off, roll-to-roll printing, direct metal printing, or conventional ruling techniques using machining, thin film deposition, grinding and polishing with the substrate as a master blank or with a replicate being attached to the substrate.

The cell electrodes 7A-7D are preferably made from a transparent conductive material, for example from conductive polymers such as PEDOT:PSS, or from transparent tin oxide based compositions, e.g. indium tin oxide (ITO). This has the advantage of reducing absorption losses and heat transfer of solar radiant energy through the cross-section of the optical element due to the electrode structure; at the same time, the transmittance of visible light through the cross-section of the optical element and the solar energy transmission of the optical element are increased. As a result, a better room illumination behind a smart window comprising the optical element can be obtained and the view from inside out is of high optical quality. Alternatively or additionally, metallic electrodes, for example aluminum electrodes, may be provided. Metallic electrodes have the advantage of being more conductive, but have a visible appearance on the optical element, e.g. a smart window comprising the optical element. The electrodes of the different groups can be made from the same material, but this is not required. It is possible to have two different materials for the electrodes defined on the top substrate and the bottom substrate.

Besides, the cell electrodes associated with a same group may be connected to a common bus bar 8A, 8B to facilitate the simultaneous delivery of control signals to each cell electrode of that same group, for switching of the optical element 1 from the first optical state to the second optical state, or vice versa. Two vertically aligned bus bars 8A, 8B are depicted in FIG. 3 with respect to the first substrate 2a; a second pair of vertically aligned bus bars with respect to the second substrate 2b are hidden from view. The two bus bars 8A, 8B extend in the x-direction adjacent to the cell 5. The first bus bar 8A connects to the cell electrodes of the first group 7A and the second bus bar 8B connects to the cell electrodes of the second group 7B, resulting in an interdigitated electrode configuration for the cell electrodes of the first and second group 7A, 7B. Likewise, a fourth bus bar (not shown) connects to the cell electrodes of the third group 7C and a fourth bus bar (not shown) connects to the cell electrodes of the fourth group 7D, resulting in an interdigitated electrode configuration for the cell electrodes of the third and fourth group 7C, 7D provided on the second substrate 2b.

It is noted that FIG. 3 shows only a small number of cell electrodes in each group, which extend transversely over the surface area of the cell 5 on a respective one of the first and second substrate 2a, 2b. A small number of cell electrodes has been chosen to be displayed mainly for the purpose of clarity; embodiments of the invention typically comprises hundreds or thousands of cell electrodes in each group.

The lateral boundary 4 may be provided as a lateral wall formed by one or more spacer components that are sandwiched between the first and second substrate 2a, 2b. The one or more spacer components may extend in a direction perpendicular to the cross-section referred to in FIG. 1 and FIG. 2 to form a horizontal wall of the cell 5 along the y-direction; the straight lines 4a, 4b depicted in FIG. 3 schematically represent such a horizontal wall in an exemplary embodiment of the invention. Line shapes of lateral walls formed by the spacer components are not limited to straight lines, but may include, or consist of, slanted or curved lines. Exemplary spacer components in embodiments of the invention may comprise spacer beads, e.g. spherical or cylindrical silica spheres, embedded in a glue. Such exemplary spacer components can be dispensed on either one, or both, of the first and second substrate 2a, 2b through a set of nozzles. After having pressed the pair of substrates 2a, 2b together, the glue is made permanent via UV exposure or by thermal activation. Another example of spacer components in embodiments of the invention includes patterned, wall-forming photoresist of a predetermined thickness.

A lateral wall formed by one or more spacer components may be a circumferential wall that completely encloses the cell 5 in both lateral directions. Such a circumferential wall may be provided as a single piece, e.g. a single spacer component, or may be composed of more than one spacer component. Where more than one spacer components meet, they are typically joint in a sealing manner. The lateral boundary 4 of the cell 5 in FIG. 3 is an example of a lateral wall formed by more than one spacer component, e.g. by four straight spacer components 4a-4d arranged as a rectangular frame. As an alternative to the embodiment shown in FIG. 3, the lateral walls 4c and 4d running vertically along the z-direction may be replaced by a sealing member of a smart window comprising the optical element 1, a face of which sealing member then acts as lateral boundary 4 to the cell 5 in the x-direction.

The lateral wall or walls forming the boundary 4 may have a wall thickness of about 200 micrometer, e.g. spacer components with a thickness of about 200 micrometer are arranged between the first and second substrate 2a, 2b. The wall thickness of the lateral boundary may, in some embodiments of the invention, be smaller than the ocular acuity, e.g. below 350 micrometer at one meter distance. Line features pertaining to the lateral walls are thus imperceptible to the human eye. A height of the lateral boundary 4 is matched to the thickness of the one or more cells 5, e.g. about 50 micrometer. A cross-sectional of spacers forming the lateral boundary may be shaped cylindrically, oval, rectangularly, trapezoidal. A surface of the spacers that is facing the at least one cell may be functionally treated, e.g. to prevent sticking of the scattering particles and/or micelles formed by surfactants. Spacers for lateral boundaries can be made from a translucent or transparent material, e.g. polymers, to improve the overall transmittance of light through the cross-section of the optical element. Alternatively, spacers may be made of an opaque material to provide a visual appearance of the optical element which, when used in a smart window, is similar to that of glazing bars in traditional windows.

In some embodiment of the invention, the lateral boundary may form part of a plurality of dividing walls for dividing the space between the pair of substrates $2a, 2b$ into a plurality of cells. A single dividing wall may then be shared between two adjacent cells, providing a lateral boundary to both cells. The switchable optical element, in accordance with such embodiments, may thus comprise a plurality of cells, which may be identical or different in size and/or shape, and each of the plurality of cells may comprise a dispersion of scattering particles within their respective cell volume. In consequence, the volume of a single cell constitutes one indivisible unit in so far as the controlled displacement of scattering particles therein is concerned.

The alignment of the lateral boundary or boundaries defining the volume of the at least one cell of the optical element with respect to the cell electrode structures on the substrates is less stringent as that of the different cell electrode groups. The cell position with respect to the cell electrode structure is generally more tolerant to shifts in the plane of the substrates as long as the cell electrode configuration extends substantially over the whole surface area of the cell. A cell volume may vary from cell to cell in an optical element comprising a plurality of cells. Irregularly spaced boundaries may be perceived as less disturbing by the human visual sensory system and can also avoid aliasing artifacts on images that contain the optical element, e.g. as part of a smart window.

Figure 4:
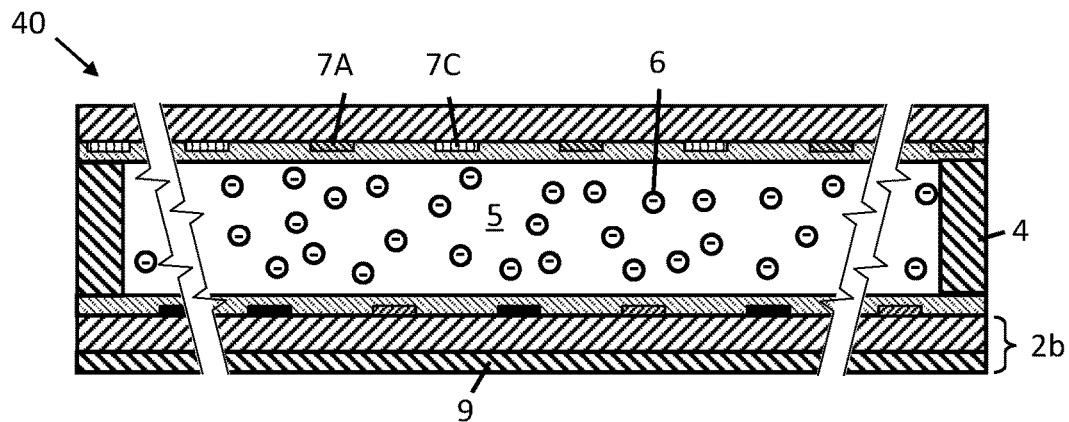
FIG. 4 is a cross-sectional view of a switchable optical element according to another embodiment of the invention, including a partially reflective layer.

Each of the first and second substrate $2a$, $2b$ of the optical element comprises a layer or a sheet of translucent material, and more preferably of transparent material, e.g. a layer or sheet of a glass-based or a plastic-based material such as float glass, PET (polyethylene terephthalate), PC (polycarbonate). The first and/or the second substrate $2a$, $2b$ may be tinted, e.g. they may comprise a colored glass. One or both of the first and second substrate $2a, 2b$ may be provided as a flexible substrate, e.g. as a thin sheet or foil of flexible plastic material, or as a mechanically rigid carrier substrate, e.g. a rigid glass sheet or plate. A translucent or transparent layer of the substrates $2a$, $2b$ typically has a transmittance larger than 50%, e.g. 70% or more. The substrates $2a$, $2b$, in embodiments of the invention, are not limited to substrates consisting of a single layer of material, but may comprise multiple layers or sheets of materials that are firmly adhering one to another, e.g. by means of one or more of gluing (e.g. laminates), bonding, coating, depositing material layers. The embodiment referred to in FIG. 4 is an example of an optical element 1 comprising a multilayered bottom substrate $2b$ the bottom surface of which is coated with a partially reflective coating layer 9. This partially reflective coating layer 9 may be a thin metallic foil, e.g. silver, adapted to transmit light in the visible range but to reflect light in the near infrared range. Additionally or alternatively, one or both substrates of the pair of substrates $2a$, $2b$ may be provided with a protective coating layer, e.g. a passivation layer comprising polyimide, to increase the mechanical strength, heat resistance, and weather resistance of the optical element 1 when used in a smart window article.

As shown in the embodiment relating to FIG. 1 and FIG. 2, additional protective layers $3a$, $3b$ may be provided on the inner faces (i.e. facing the cell 5) of the first substrate $2a$ and the second substrate $2b$ respectively, such that the protective layers $3a$, $3b$ extend over and cover the electrodes 7A-7D formed on the inner faces. This has the positive effect of preventing a direct exposure of the electrodes 7A-7D to the dispersion of scattering particles 6, whereby a charge injection from the electrodes to the scattering particles, possibly via the presence of inverted micelles, is suppressed or at least significantly reduced. The protective layers may be provided as thin dielectric layers, e.g. a thin layer of silicon oxide ($SiO_2$). Providing a thin dielectric layer as protective layer has the advantage of protecting the electrodes from chemical damage and strongly inhibiting uncontrolled charge injection from the electrode into the dispersion without significantly affecting the electric field strength of the portion of an electric field that is extending into the volume of the cell 5 in response to charges being accumulated on these electrodes. Therefore, the electrodes may be driven by lower voltage signals, which reduced the energy consumption of the switchable optical element. Alternatively, the electrodes 7A-7D provided on either one or both substrates $2a$, $2b$ may be formed on an outer face (i.e. facing away from the cell 5) of the substrate(s). For such embodiments, the substrate itself acts as a protective layer between the electrodes and the dispersion of scattering particles. The substrate may then comprise or consist of one or more dielectric layers, and the electrodes on the outer face of the substrate may be coated by a protective layer to avoid damage.

The cell 5 comprises, in its volume, a plurality of dispersed and charged scattering particles 6. The scattering particles 6 may be nanoparticles, e.g. coated or uncoated nanoparticles, core-shell nanoparticles, surface-functionalized nanoparticles, etc. They may have a diameter ranging from 50 nm to 1000 nm, preferable in the range of a few 100 nm, e.g. 200 nm to 500 nm. For example, the cell 5 may contain a colloidal dispersion of charged nanoparticles, e.g. charged nanoparticles obtained from white pigments such as titanium oxide ($TiO_2$), zinc oxide (ZnO), barium sulfate ($BaSO_4$). The plurality of dispersed and charged scattering particles 6 can also be provided as a mixture of different material colloidal nanoparticles. Moreover, the plurality of dispersed and charged scattering particles 6, e.g. nanoparticles, may have a broad diameter size distribution. An advantage related to differently sized charged nanoparticles is that light incident on the optical element can be scattered, e.g. also backscattered, efficiently in different wavelength regions.

Preferably, a selected material, and/or size, and/or shape of the scattering particles, e.g. nanoparticles, is associated with strong isotropic scattering and a high optical refractive index with respect to the continuous phase, e.g. a refractive index contrast $\Delta n$ greater than 0.2, e.g. ranging between 0.2 and 1.5. Efficient back-scattering then results from a plurality of such scattering particles, when dispersed in the cell 5 volume at a concentration that is adequate for inducing multiple scattering events for light passing through the cell 5. In some embodiments, the scattering particles may comprise one or more resonances in the sunlight spectrum, e.g. resonant scattering by the scattering particles at one or more wavelengths is possible. This is of advantage if the optical element is designed to a customer's preferences for specific hues.

The scattering particles 6 may be dispersed (i.e. the dispersed phase) in any suitable continuous phase in which they are mobile under electrophoresis. In general the continuous phase is a fluid, e.g. a liquid or a (rarefied) gas or vacuum. In preferred embodiments of the invention, the scattering particles are colloidal particles suspended in a liquid solvent phase, for instance a non-polar solvent, e.g. a non-polar solvent with low dielectric constant such as dodecane. It follows from the foregoing considerations that the scattering particles 6 can be subject to an electric force field, e.g. electric field extending into the volume of cell 5 filled by the particle dispersion, induced by corresponding control signals applicable to the cell electrodes 7A-7D. In consequence, a displacement of the scattering particles 6 can be manipulated by electrophoresis in the presence of the induced force field. This results in a controlled and directed collective motion of one or more groups of scattering particles 6 within the cell 5. In embodiments of the invention, the concentration, c, of the scattering particles 6 dispersed in the continuous phase may be selected such that the product of scattering particle concentration and cell thickness is larger than the inverse of the total optical scattering cross-section of the particles, to provide for efficient scattering of solar irradiation incident on the optical element 1. In same or other embodiments of the invention, the concentration, c, of the scattering particles 6 dispersed in the continuous phase may be selected such that they constitute between 0.2% and 10% by weight relative to the weight of the continuous phase.

The use of non-polar solvents is advantageous, because they are generally associated with a low dielectric constant (relative permittivity $\varepsilon$), e.g. a relative permittivity $\varepsilon$ lower than ten. A liquid phase having a low dielectric constant is advantageous, because this reduces the capacitance between top electrodes and bottom electrodes which receive the voltage signals for inducing the electrophoretic motion of the scattering particles. A lower capacitance is also lowering the associated RC time constant for building up the voltage signal, whereby faster sequences of voltage pulses can be received to accelerate the switching of the optical element, and less charges have to be moved onto or removed from the electrodes, which has the benefit of lowering the power consumption due to switching. A lower dielectric constant of the solvent also increases the electric field in the neighborhood of a particle with a given charge. Moreover, charging effects in non-polar colloids have been demonstrated with surface potentials similar to aqueous solutions, but with much larges Debye lengths. This has the advantage of reducing the electrophoretic retardation force. Preferably, the boiling point of the liquid solvent phase is high to prevent evaporation of the solvent and leakage of the vapor phase from the cell, e.g. in hot and sunny climates with high solar irradiance. Different non-polar solvents may be mixed, e.g. to adjust the refractive index of the solvent. A lower refractive index of the solvent has the further advantage that the amount of total internal reflection at the substrate-air interface is reduced, whereas reflection at the solvent-substrate interface is small, e.g. typically of the order of a few percent, or less, thus allowing for a good extraction of the backscattered light in the cell 5 back into the outdoor environment. Any residual reflection at the solvent-substrate interface can be further reduced with a wide-angle broadband (e.g. covering the visible and near-infrared spectral region) anti-reflective coating provided at this interface.

Moreover, the liquid phase may also comprise a surfactant, e.g. polyisobutylene succinimide (OLOA 11000), aerosol sodium di-2-ethylhexylsulfosuccinat (AOT), or non-ionic sorbitan oleate (SPAN 80) to obtain good stabilization, e.g. by means of steric hindrance, of the dispersed and electrically charged scattering particles. This avoids coagulation of scattering particles of the colloidal type, for example, and further prevents the electric charge carried by a scattering particle of being lost and the scattering particle becoming incapable of electrophoresis. In addition thereto, the surfactant may act as a charge-control agent, i.e. assists in transferring charge to the dispersed scattering particles, e.g. through the formation of inverse micelles, having diameters of about 2 nm. Inverse micelles lower the thermal energy barrier related to the creation of ions in the non-polar solvent and therefor promote the charging of the dispersed colloidal scattering particles. The scattering particles 6 are shown to carry a negative charge, which may be a multiple of an elementary charge, e.g. "−100 e", but can also be positively charged by multiples of an elementary charge, e.g. "+100 e".

Furthermore, the cell 5 volume comprises a transport region 10 and a confinement region 11. In the first optical state, the dispersed scattering particles 6 are essentially free and are spread over the entire volume of the cell 5, including the confinement region and the transport region. In contrast thereto, the scattering particles 6 are concentrated in the confinement region in the second optical state, from which they are prevented to escape, e.g. by way of diffusion, by repeatedly applying an adequate pull-back control sequence to the cell electrode groups. The pull-back sequence induces an electric force field and the confinement of the scattering particles 6 is restored via electrophoresis in the induced electric force field.

In the embodiments referred to in FIGS. 1-3, the confinement region 11 is a lateral confinement region, e.g. a narrow strip-like or band-like region. It extends from the lateral boundary 4b into the adjacent cell volume. The remaining volume of the cell 5, e.g. the portion of the cell volume that is not occupied by the (actively used) confinement region 11, constitutes the transport region 10. For example, a confinement region 11 in the vicinity of the lateral boundary 4b, in cross-sectional view, extends up to 1 mm, or less, into the adjacent cell volume, whereas the cleared transport region 10 of the cell 5, in the same cross-section, may extend over length of 9 mm or more. The advantage of an optical element configured for having a lateral confinement region is that the lateral boundary acts as a natural barrier with respect to a diffusive motion of the scattering particles. Therefore, an adequate pull-back control sequence can be applied unilaterally to the cell electrode groups, e.g. restoring forces are only induced at one side of the confinement region.

According to other embodiments of the invention, the confinement region is a lateral confinement region, but extends only from a limited portion of the lateral boundary into the adjacent cell volume. For instance, a confinement region located at a corner of the cell is extending into cell volume only in proximity to the corner, with the corner being formed by two abutting lateral walls oriented at a non-zero angle. According to yet other embodiments of the invention, the confinement region corresponds to an inner region, i.e. a non-lateral region, e.g. a center region of the cell, and the transport region completely surrounds the confinement region. In embodiments of the invention, a confinement region may have a spatial extent in a direction of transport (of the scattering particles by electrophoresis) corresponding to four to twenty successive cell electrodes in cross-sectional view, e.g. in a plane perpendicular to the (locally) predominating direction of elongation of the cell electrodes in proximity to the confinement region. In contrast thereto, a spatial extent of the transport region in the same direction of transport may correspond to hundreds or thousands of successive cell electrodes, e.g. the spatial extent of the transport region in the direction of particle transport differs from that of the confinement region by at least one order of magnitude.

Although the lateral confinement region 11 in FIGS. 1-2 is indicated on the left-hand side of the cell 5, a further confinement region 11' of equal dimensions exists on the right-hand side of the cell 5, but is not actively used to accumulate scattering particles 6 in the second optical state (e.g. clear state). Nevertheless, the further confinement region 11' may be actively used to concentrate scattering particles 6 in the second optical state if the scattering particles were provided with opposite charge, or if a direction of transport of the scattering particles 6 was reversed by reversing an ordered sequence of control signals applicable to the cell electrode groups 7A-7D. Besides, optical elements in accordance with embodiments of the invention may be configured to have more than one actively used confinement region, e.g. two or more lateral confinement regions in the vicinity of different corners of a cell of the optical element, or two or more inner (e.g. central) confinement regions within a cell of the optical element, or combinations thereof.

A scattering state, referred to as the first optical state, is illustrated in FIG. 1. It is associated with strong optical scattering, in particular strong optical backscattering, in the presence of the dispersed scattering particles 6 in the unconfined configuration, e.g. the configuration in which the scattering particles are distributed substantially over the whole volume of the at least one cell 5 of the optical element 1, including the transport region 10. It is an advantage of strong optical backscattering that a fraction of the incoming radiation, e.g. sunlight, is neither absorbed by the optical element, nor is it transmitted into an interior space behind the optical element, e.g. a room behind a smart window comprising the optical element. The solar heat gain of that space is thus reduced, i.e. the generation of heat by re-emission at longer wavelength (long-IR) of absorbed light at shorter wavelength (e.g. visible and short-IR) is reduced, without significantly affecting the illumination of that space, e.g. a reduction of the illumination of the room for which no extra room lighting is necessary to compensate for the reduction in solar gain. The free distribution of dispersed particles 6 can be a homogenous distribution or approximate a homogenous distribution. A homogenous distribution leads to a more homogenous scattering across the cell, whereas an approximately homogenous distribution may cause gradients in the scattering efficiency across the cell. These gradients may be noticeable as varying grades of translucence or haze when the optical element 1 is switched into the scattering state. A weight concentration of the scattering particles may be increased to an amount, dependent on the cell thickness, where multiple scattering effects become important. Multiple scattering events may advantageously redirect a portion of the forward scattered light into the backward direction, i.e. increase the overall backward scattering efficiency of the cell. In addition thereto, multiple scattering also smoothens any noticeable variances of translucence or haze when the optical element 1 is switched into the scattering state. A concentration of the scattering particles 6 caused by gravitational forces over longer period of times, which means a more noticeable deviation from a homogenous distribution of the scattering particles 6 within the volume of the cell 5, can be overcome by a counteracting electrophoretic motion, e.g. via the application of an adequate sequence of control signals to the electrodes 7A-7D.

The non-scattering clear state, referred to as the second optical state, is depicted in FIG. 2. In contrast to the scattering state it is associated with weak or negligible optical scattering by the dispersed scattering particles 6. When the optical element 1 is switched to the non-scattering state, the scattering particles 6 are concentrated into a confinement region 11 of the cell 5, hence are no longer distributed substantially over the whole volume of the cell 5. The scattering particles are said to be in the confined configuration, in which they are prevented from spreading into the adjacent regions of the cell 5. A free motion of the scattering particles 6 is restricted in the confined configuration when the optical element 1 is switched to the non-scattering state. Furthermore, a spreading of the concentrated scattering particles 6 by diffusion can be counteracted, and the confinement of the particles maintained even over longer periods of time, by applying a suitable sequence of control signals to the electrodes 7A-7D.

According to embodiments of the invention, the optical element or a smart window comprising at least one optical element may have a transmittance which can be switched between 10% in the first optical state (e.g. scattering state) and 85% in the second optical state (e.g. the clear state). A reflectance of the optical element or a smart window comprising at least one optical element may be switched between 90% in the first optical state and 15% in the second optical state, and the absorbance is typically negligible in comparison to the transmittance/reflectance values. The scattering, reflectance and transmittance of light with respect to the optical element can further be influenced by providing substrates with a predetermined surface finish (e.g. polished smooth, or roughened) and/or by providing transparent anti-reflective or partially reflective coatings on one or both substrates of the pair of substrates.

Figure 5:
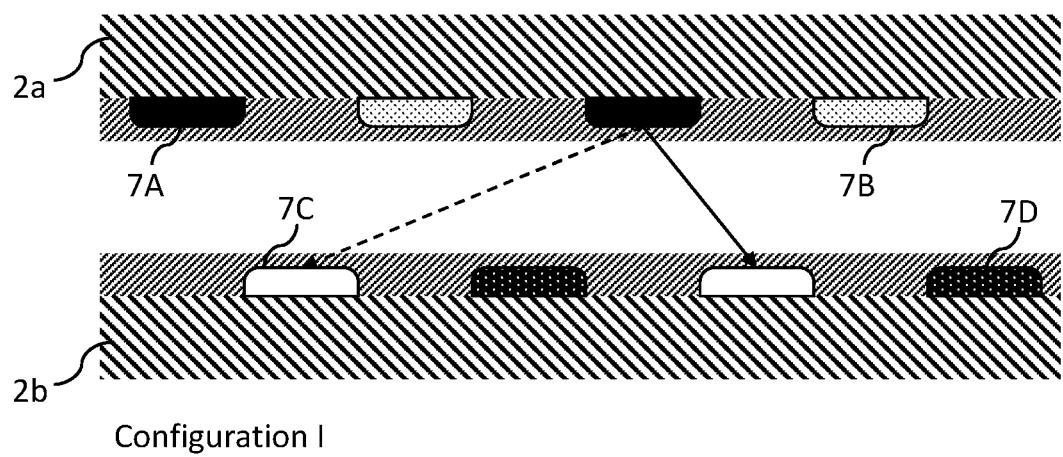
FIG. 5 shows a portion of a cross-sectional view of a switchable optical element, explaining different cell electrode configurations in accordance with embodiments of the invention.
Figure 5:
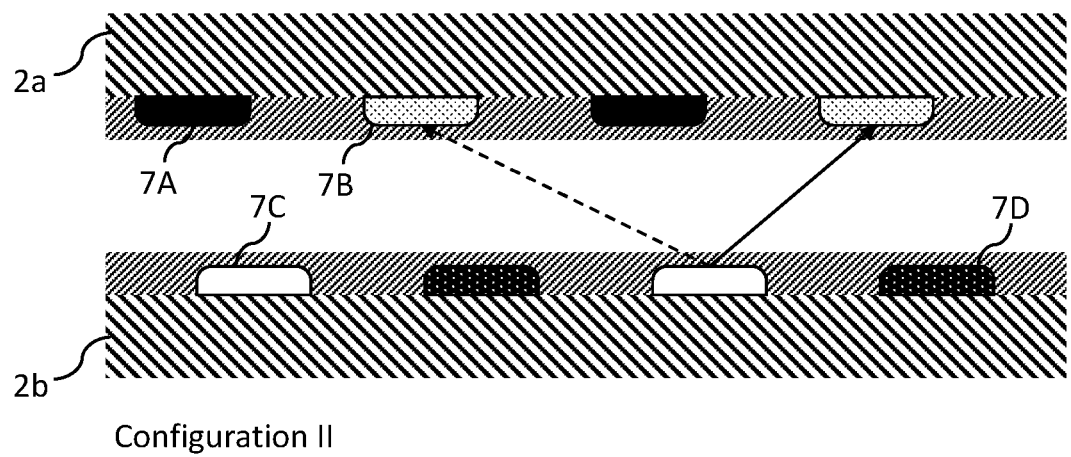
Figure 5:
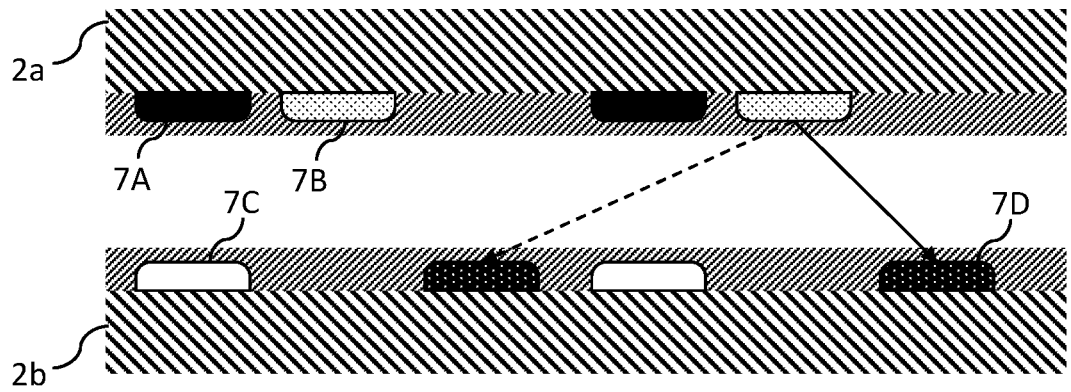

With reference to FIG. 5, differently aligned electrode configurations according to embodiments of the present invention are explained.

A first configuration, "Configuration I", is shown in the top part of the figure. The individual cell electrodes of each group 7A-7D are regularly spaced, e.g. successive individual cell electrodes of the same group are positioned such that they are separated by a predetermined full pitch, e.g. a 50 micrometer full pitch. According to the first configuration, the cell electrodes of the second group 7B are center-aligned along the transport direction (e.g. along the x-axis) with respect to adjacent cell electrodes of the first group 7A on the first substrate 2a, e.g. positioned at half-pitch, and the cell electrodes of the first group 7A are center-aligned along the transport direction (e.g. along the x-axis) with respect to adjacent cell electrodes of the second group 7B on the first substrate 2a, e.g. positioned at half-pitch. Idem for the cell electrodes of the third and fourth group 7C and 7D on the second substrate 2b. Additionally, the cell electrodes of the third group 7C on the second substrate 2b are center-aligned along the transport direction (e.g. along the x-axis) with respect to adjacent cell electrodes of the first group 7A and second group 7B on the first substrate 2a, e.g. positioned at a quarter of the full pitch, and the cell electrodes of the fourth group 7D on the second substrate 2b are center-aligned along the transport direction (e.g. along the x-axis) with respect to adjacent cell electrodes of the first group 7A and second group 7B on the first substrate 2a, e.g. positioned at three quarters of the full pitch. This results in a doubly-interleaved electrode structure without overlap for the four groups of cell electrodes along the transport direction (e.g. along the x-axis) of the cell 5.

A second configuration, "Configuration II", is shown in the middle part of the figure. The individual cell electrodes of each group 7A-7D are regularly spaced, e.g. successive individual cell electrodes of the same group are positioned such that they are separated by a predetermined pitch, e.g. a 50 micrometer pitch. The second configuration differs from the first configuration in that doubly-interleaved electrode structure for the four groups of cell electrodes along the transport direction (e.g. along the x-axis) of the cell 5 is now partially overlapping. The cell electrodes of the third and fourth group 7C, 7D on the second substrate 2b are no longer center-aligned along the transport direction (e.g. along the x-axis) with respect to adjacent cell electrodes of the first group 7A and second group 7B on the first substrate 2a, but are collectively moved closer towards an adjacent cell electrode of the first group 7A and second group 7B on the first substrate 2a in the direction of transport (e.g. along the x-axis).

A third configuration, "Configuration III", is shown in the bottom part of the figure. The individual cell electrodes of each group 7A-7D are regularly spaced, e.g. successive individual cell electrodes of the same group are positioned such that they are separated by a predetermined pitch, e.g. a 50 micrometer pitch. The third configuration differs from the first configuration and also the second configuration in that the cell electrodes of the first and second group 7A, 7B are now asymmetrically interleaved. In order words, the cell electrodes of the second group 7B are no longer center-aligned along the transport direction (e.g. along the x-axis) with respect to adjacent cell electrodes of the first group 7A on the first substrate 2a, but are aligned more to the left and approaching a preceding cell electrodes of the first group 7A, e.g. cell electrodes of the second group 7B are positioned at less than half-pitch, e.g. about a third of the full pitch. Idem for the cell electrodes of the third group 7C on the second substrate 2b, which are no longer center-aligned along the transport direction (e.g. along the x-axis) with respect to adjacent cell electrodes of the fourth group 7D, but are aligned more to the left and approaching a preceding cell electrodes of the fourth group 7D, e.g. cell electrodes of the third group 7C are positioned at less than a quarter of the full pitch, e.g. are aligned with corresponding cell electrodes of the first group 7A in the direction of transport (e.g. along the x-axis). Additionally, the cell electrodes of the fourth group 7D on the second substrate 2b are approximately aligned with gaps between successive cell electrodes of the first and second group 7A, 7B on the first substrate 2a, along the transport direction (e.g. along the x-axis). Cell electrodes of the fourth group 7D on the second substrate 2b may be positioned at about two thirds of the full pitch.

In all three configurations, the respective electrode pattern is repeated many times over the lateral size (e.g. x-direction) of the cell 5 to extend over the entire cell 5 surface area, e.g. as illustrated in FIG. 3. The configurations shown in FIG. 5 are only a small fraction of the overall electrode structure of the optical element 1. Moreover, all three configurations demonstrate that for any given cell electrode x on either the first substrate or on the second substrate and for a given cell electrode group Y located on the substrate opposite to the substrate of the given cell electrode x, there always exists a unique cell electrode y of that group Y which is closest to the cell electrode x (measured as center-to-center distance between cell electrodes x, y in the cross-section). In FIG. 5, this is indicated by the solid arrow and the dashed arrow, both originating from a cell electrode x and terminating at the closest cell electrode y of group Y and the next-to-closest cell electrode of group Y respectively. This characteristic has the effect that a collection of scattering particles accumulated underneath cell electrode x are attracted preferentially by cell electrode y when all cell electrodes of group Y are brought to an equal potential for inducing force fields in the cell for attracting and further displacing the scatter particle collection underneath cell electrode x. In other words, in the cross-sections of FIG. 5, a mirror symmetry is broken in each point along the lateral direction, resulting in a dominating transport direction for the scattering particles when predetermined control signals are sequentially applied to the different cell electrode groups.

Figure 6:
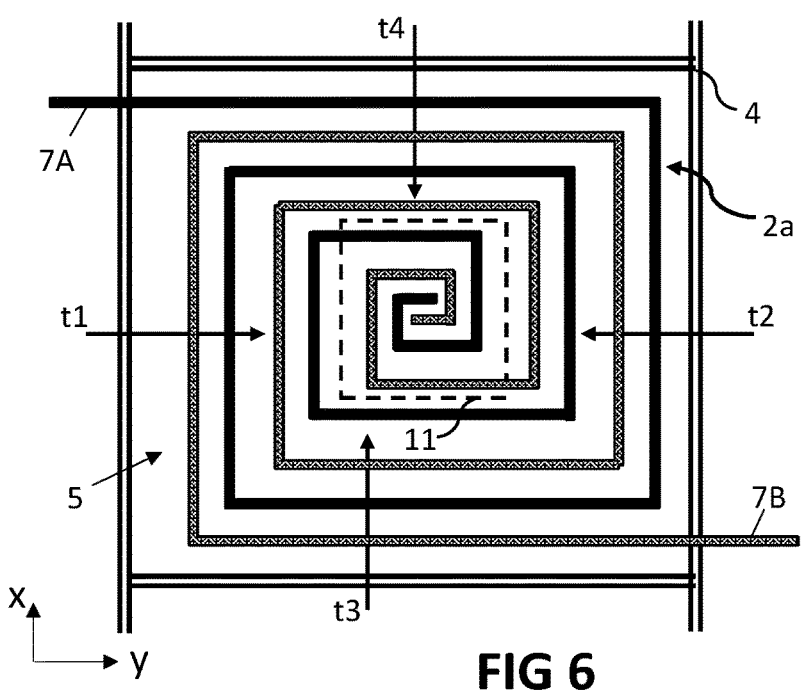
FIG. 6 is a top view of a switchable optical element, illustrating a spiraling cell electrode configuration in accordance with embodiments of the invention.

Referring now to FIG. 6, a further electrode configuration for a cell 5 is explained. Contrary to the cell electrode configurations in cross-section along lines of transport (e.g. along x-direction), which has been previously described with reference to FIG. 5, the cell electrode configuration depicted in FIG. 6 is concerned with the global shape of individual cell electrodes relative to the surface of the cell 5. An interleaved spiraling electrode configuration of two electrode arms 7A, 7B, spiraling without crossing each other, which can be used in embodiments of the invention, is shown in top view with respect to the first substrate 2a. An analogue spiraling electrode configuration is provided on the second substrate 2b, but is not shown in the figure for simplicity. The spiraling electrode configurations comprise, on either substrate of the pair 2a, 2b, alternating electrode segments which belong to a different electrode group. A particularity of the spiraling electrode configurations consists in the presence of a transport region with spatially varying directions of transport, t1 to t4, as one follows the elongated paths described by the cell electrode of each group 7A-7D. Locally, a cross-section taken along a line as indicated by the arrows for the transport directions t1 to t4 still results in one of the cross-sectional electrode configurations described with reference to FIG. 5.

The interleaved spiraling electrode configuration allows for alternating electrode segments in two lateral directions (e.g. x-direction and y-direction) and a confinement region 11 in the center, or close to the center, of the cell 5. As a consequence, scattering particles 6 can be confined into a dot-like region, or extended dot region, e.g. square region, which is smaller than and less noticeable than a stripe-like region. Instead of the straight electrode segments, also curved electrode segments can be arranged into a spiral. For curved electrodes or electrode segments, a continuum of transport directions for the dispersed scattering particles may be defined in the transport region, or at least a part of it, with respect to cell boundary or the confinement region.

For an optical element 1 comprising only a single cell 5 to be controllably switched (e.g. only one cell being provided, or only one cell out of a plurality of cells being actually controlled), no bus bars are implemented. For embodiments of the invention comprising more than one controllable cell 5 in the optical element 1, e.g. a cell string of concatenated cells in x-direction or y-direction including cell 5 of FIG. 6, two pairs of bus bars may be provided, each bus bar connecting to the cell electrodes of a same group. For instance, a spiraling electrode arm 7A or 7B associated with the spiral structure of each cell 5 may originate from, and branch out from, a corresponding bus bar provided on the first substrate 2a. Idem for the spiraling electrode arm 7C or 7D provided on the second substrate 2b. It is also possible to provide two or more such spiraling structures for each cell 5 if the total length of each spiraling electrode arm 7A-7D becomes excessive in view of the resistance and RC time constant related thereto. In this case, the confinement zone corresponds to a collection of disjoint dot-like or square regions located in each spiral center.

It is an advantage of cell electrode configurations according to embodiments of the invention that these configurations are free of crossings. The absence of intersecting or crossing cell electrodes significantly simplifies the step of providing the cell electrodes, e.g. by manufacture. For instance, a single lithographic exposure and etching step is sufficient to define and pattern all the required cell electrode structures, whereby alignment, adhesion and planarity issues related to multiple exposure/etching cycles are avoided.

Figure 7:
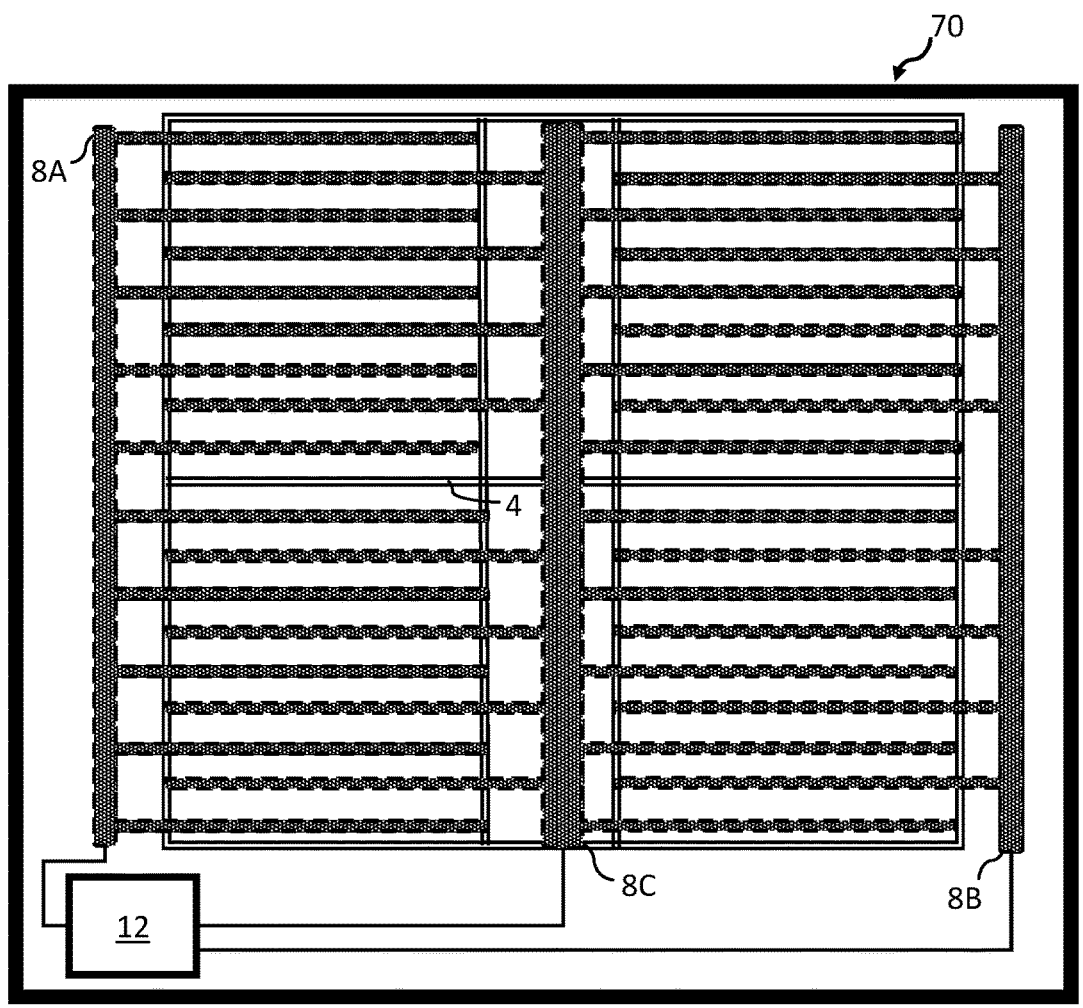
FIG. 7 is a top view of a variant of the switchable optical element shown in FIG. 3, comprising a plurality of cells and a bus bar system in accordance with embodiments of the invention.

FIG. 7 shows an exemplary embodiment of the invention, in which the switchable optical element 70 comprises a plurality of cells 5. The lateral boundary 4 of each cell 5 may form part of a plurality of dividing walls, for dividing the space between the pair of substrates 2a,2b into a plurality of cells. A single dividing wall may be shared between two adjacent cells, providing a lateral boundary 4 to both cells. The plurality of cells 5 of the switchable optical element 70 may be identical, or may differ in size and/or shape. Each cell may comprise a dispersion of scattering particles 6 within their respective volume. Additionally, the optical element 70 comprises a bus bar system for the distribution of control signals to the different groups of cell electrodes, e.g. a bus bar system composed of three bus bars on each substrate, e.g. a central bus bar 8C and two side bus bars 8A, 8B per substrate. The bus bars of the bus bar system are connected or operatively connectable to a driver unit 12. The driver unit 12 is configured for generating and sending control signals for switching of the optical element 70 from a first optical state to a second optical state, or vice-versa, according to a method for switching as explained further below.

The driver unit 12 may be located remotely from the optical element 70, e.g. being part of a window frame receiving a smart window that comprises the optical element 70, or may be integrated into or attached to the optical element 70, e.g. attached to one of substrates of the pair of substrates 2a, 2b at a location that is not intended for light transmission in either optical state, e.g. at a periphery of one of the substrate that can be covered so as to be protected and hidden from view. The driver unit 12 may comprise additional functional units, such as a timing unit for the timing of the control sequences, a memory unit for storing instructions related to operating the optical element, and for storing control sequences, or references thereto, and a processing unit (e.g. processor, microcontroller) for determining which control sequence is to be generated for a specific cell electrode group in the events of switching from the first optical state to the second optical state, or vice versa, and optionally, also for correcting an optical state. In embodiments of the invention relating to the optical element, the driver unit 12 is thus adapted for carrying out the steps of a method for switching of the optical element according to the second aspect described further below.

Switching of the optical element 70 in FIG. 7 will result in switching of each cell 5 being part of the optical element 70. However, other embodiments of the invention may comprise switching of the optical element between the two optical states without having all the cells of the optical element switched accordingly. For instance, individual cells of the optical element may be connected to the bus bar system via control switches for selectively switching the optical state of one or more cells.

Figure 8:
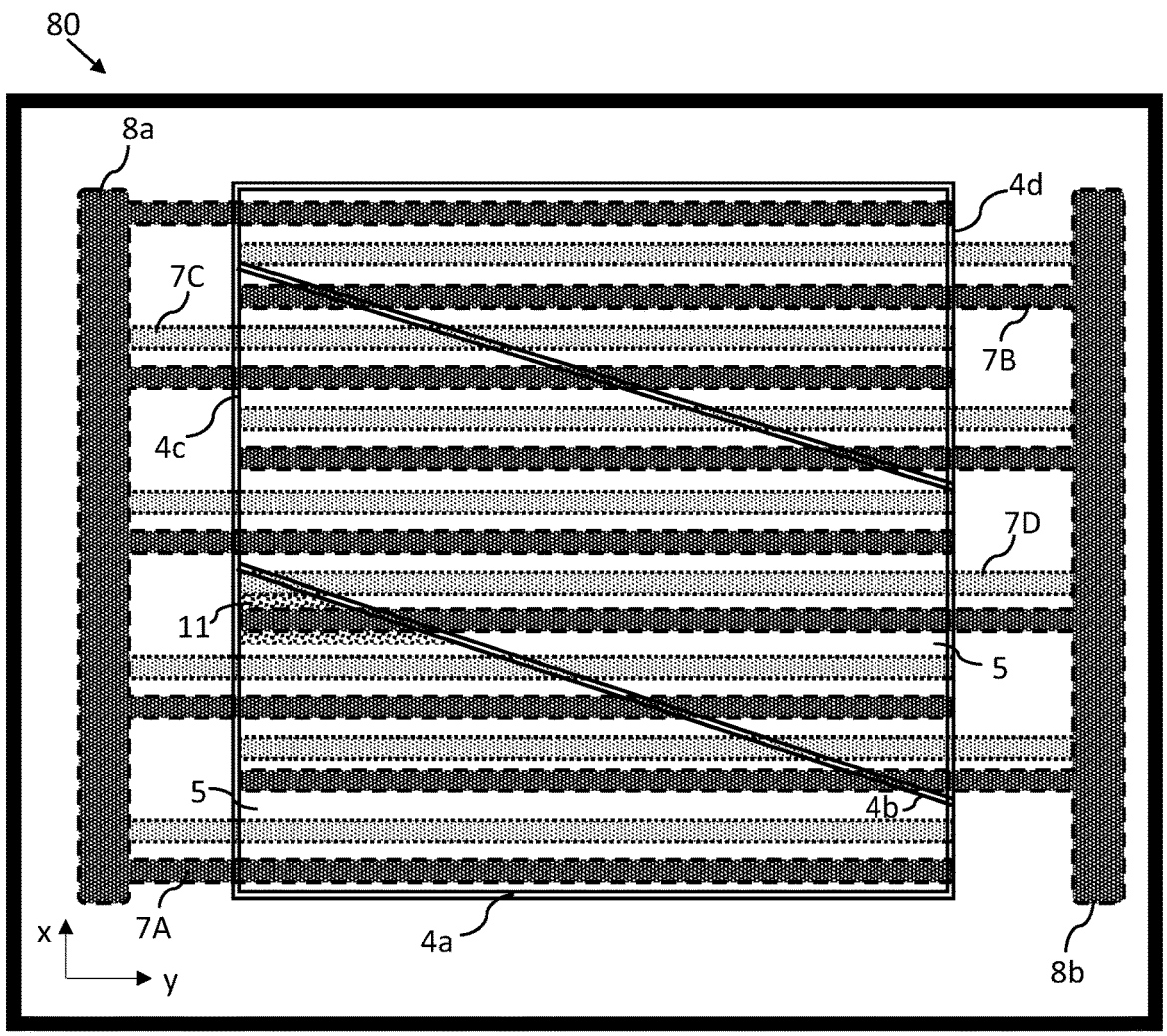
FIG. 8 is a top view of another variant of the switchable optical element shown in FIG. 3, comprising a plurality of cells separated by slanted dividing walls, in accordance with embodiments of the invention.

Referring briefly to FIG. 8, a variant of the embodiment relating to FIG. 3 is shown. The optical element 80 in FIG. 8, as compared to the optical element 1 in FIG. 3, comprises a plurality of cells 5. Besides, adjacent cells of the plurality of cells are separated by a common lateral boundary 4b, e.g. a dividing wall provided by a spacer component, which is obliquely downwards running with respect to the horizontal and vertical boundaries 4a, 4c and also with respect to the direction of elongation of the fingered cell electrodes (e.g. y-direction). In consequence, not all the cells 5 are identical in shape and size, e.g. the uppermost and lowest cell in the vertically stacked plurality of cells are different in shape and size from the intermediate cells in the stack. Except for the uppermost cell, a confinement region 11 of the cells is more concentrated towards the (sharp-angled) tip, i.e. is shrunk with respect to a more extended confinement region 11 of the embodiment referring to FIG. 3, where it is extending substantially over the entire length of lateral boundary 4b. This has the advantage that the residual light scattering by a non-covered confinement region of the optical element in the clear state is less noticeable to the user, e.g. a small-sized spot maintaining a degree of translucence or opaqueness may be less noticeable as compared to a fully extended line, albeit the line being narrow relative to the overall light transmissive surface area of the optical element.

In the following, a second aspect of the invention directed to a switching method for switching the cell or cells of the optical element from a scattering state to a non-scattering state will be described.

During switching, the charged scattering particles are collectively displaced by electrophoresis. Their motion is directed from the transport region towards the confinement region(s). The scattering particles are displaced laterally, i.e. the scattering particles are transported along a lateral direction of transport, generally perpendicular to the longitudinal axis of the cell electrodes, and are moved out of the transport region and into the confinement region(s). Scattering particles entering a confinement region of the cell stop being laterally transported, but may still undergo an erratic or oscillating movement due to the interplay of diffusion and electrophoresis in the confinement region. Electrophoretic conditions for lateral displacement are induced in the cell, in particular in the transport region thereof, by the generation of electric force fields that extend into the cell and to which the dispersed charged scattering particles are subject. The generated electric force fields are time-varying and spatially localized force fields that shift in the lateral transport direction. In a moving frame centered on a scattering particle being transported, the electric force fields so generated during switching typically have a net (e.g. time-averaged) component in the lateral direction of transport which is substantially different from zero. In that same moving frame, the electric force fields so generated during switching typically also have a component in a surface-normal direction, e.g. a direction perpendicular to the lateral transport direction and the faces of the substrates in the cross-sections of FIGS. 1-2 and FIG. 5. In contrast to the lateral component, the surface-normal component of the electric force fields is oscillating and generally averages out over time. The time-averaging effect is caused by alternating the field direction of the surface-normal component over time, depending on whether the electric force fields are originating from cell electrodes located on the first substrate or on the second substrate. This averaging effect is beneficial insofar as it prevents the sticking or accumulation of scattering particles at or near a face of the pair of substrates, or a layer provided thereon, over long time periods, which would impede a fast switching process and also increase frictional forces. Electric force fields are generated in response to control signals being delivered to the different groups of cell electrodes. To generate the time-varying and shifting electric force fields, control signals are provided sequentially to the different groups of cell electrodes, one group at a time. In addition thereto, the control signals are alternately applied to a group of cell electrodes located on the first substrate and located on the second substrate, respectively.

Figure 10:
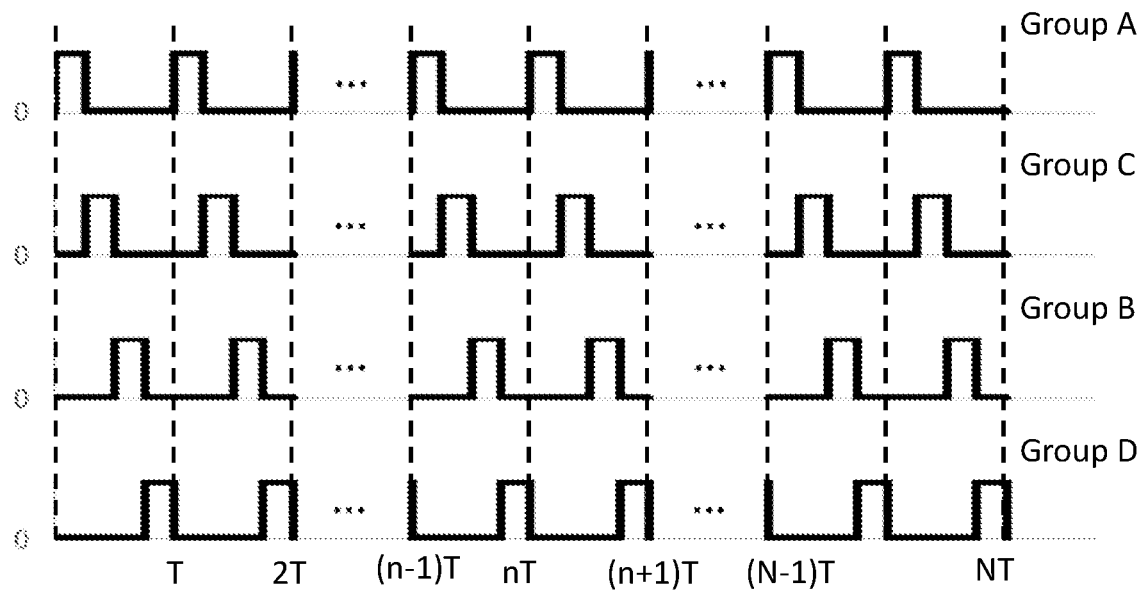
FIG. 10 is a timing diagram for the control signals to be received by the cell electrodes of a switchable optical element, for switching the optical element from the first optical state to the second optical state, in accordance with embodiments of the invention.

An exemplary method for switching a cell of the optical element from the first optical state, e.g. the light-scattering state, to the second optical state, e.g. the non-scattering state, is now explained. According to this method, each one of the four cell electrode groups 7A-7D is being driven by a corresponding control signal for which a timing diagram is shown in FIG. 10. Therein, each control signal is associated with one of the cell electrode groups. The control signals, from top to bottom, are for Group A, Group C, Group B, and Group D, and each control signal comprises a sequence of driving pulses, e.g. a pulse train, e.g. a pulse train of voltage pulses. The driving pulses of the sequences are applied periodically with time period T, and each driving pulse has a duty cycle of about 25%. Within each time period T, the driving pulses of the respective control signals succeed one another in time. For example, for each time interval of duration T (e.g. 0 ... T, T ... 2T, etc.) a first pulse is applied to the cell electrodes of the first group (Group A), directly followed by a second pulse applied to the cell electrodes of the third group (Group C), a third pulse applied to the cell electrodes of the second group (Group B), and eventually a fourth pulse applied to the cell electrodes of the fourth group (Group D). It is noted that embodiments of the invention are not limited to control signals in which driving pulses delivered to different cell electrode groups are directly following one another in time, but may be delivered in succession with quiet time intervals therebetween, e.g. two consecutive driving pulses delivered to two different cell electrode groups are separated by a pulse-free time interval. To avoid a significant spreading of the laterally transported scattering particles by diffusion, such a quiet time interval between consecutive driving pulses will typically short relative to characteristic diffusion time $L^2/6D$, with L the mean distance between adjacent cell electrodes in the lateral transport direction (e.g. a mean distance L of a quarter of the full pitch) and D the diffusion constant of the dispersed scattering particles. Non-overlapping driving pulses in each time period T comprising pulse-free or quiet intervals may be obtained by reducing the pulse duty cycle to below 25%, e.g. by selecting pulse duty cycles between 5% and 25% for each control signal. It is further noted that, although the driving pulses of the respective control signals in FIG. 10 are not overlapping at any moment in time, this does not mean that driving pulses cannot overlap in time for timing diagrams of alternative switching methods. For instance, driving pulses delivered to two consecutive groups (e.g. Group A-Group C, Group C-Group B, Group B-Group D, Group D-Group A) can partially overlap, e.g. by selecting duty cycles for the driving pulses of each control signal which are greater than 25%, e.g. up to and including 50% duty cycle. This has the consequence that sets of charged scattering particles may not entirely be transferred to regions proximate to the currently addressed cell electrodes before the control signal toggles to the next group of cell electrodes. However, the surface-normal transport distance of the scattering particles is also reduced, limiting the energy dissipation due to friction along the surface-normal direction.

Applying the control signals in the timing diagram of FIG. 10 to the first electrode configuration (Configuration I) depicted in FIG. 5, small sets of charged scattering particles from underneath cell electrodes of the first group 7A upon delivery of the first driving pulse at the start of the timing diagram, which sets are then transported laterally in a zig-zagging movement towards a confinement region of the cell. With each new driving pulse, the sets of scattering particles accumulated in proximity of cell electrodes of a previously addressed group of cell electrodes are transferred diagonally towards the cell electrodes of the currently addressed group of cell electrodes, which is located on the opposite substrate. The zig-zagging displacement on a fine-grained observation scale gives rise to a lateral transport of the scattering particles at a coarse-grained observation scale, which is maintained as long as it takes to also move the most distant of the initially formed scattering particle sets in the transport region into the confinement region. Typical values for the number of time periods T during which the control signals for switching between the first and the second optical state are delivered to the cell electrodes may be tens to hundreds of such periods, e.g. N=50 time periods in FIG. 10. A driven pulse, e.g. lasting for one quarter of the time period, may have a pulse length of several milliseconds, e.g. 20 ms. Therefore, a switching time from the first optical state to the second optical state may, in embodiments of the invention, not last more than 1 s in duration.

At that point of time, the delivery of control signals is stopped, e.g. when an electronic counter for counting the number of time periods exceeds a predetermined threshold value, and substantially all of the scattering particles are confined to the confinement region of the cell. Because of diffusion, the confined scattering particles tend to escape from the confinement region after a characteristic time after stopping the delivery of control signals to the cell electrodes, e.g. after a time of the order of the diffusion time $s^2/6D$ with s being the characteristic length scale of the confinement region in lateral transport direction, e.g. 1 mm, and D the diffusion constant for the scattering particles. Therefore, a correction control signals may be applied at regular time intervals $\Delta t$ approximately equal to the diffusion time, e.g. every 10-100 s, to restore strong confinement of the diffused scattering particles. As a result, scattering particles that have diffused out of the confinement region and over an associated characteristic diffusion length sqrt ($6D \Delta t$) in the lateral direction of transport into the adjacent transport region, are successfully laterally transported back into the confinement region. The correction control signals may be selected to be identical to the control signals for switching to the non-scattering second optical state for simplicity, but typically involve far less repetitions in terms of time periods during which the correction control signals are delivered to the cell electrodes. Moreover, the applied corrections occur on a time scale that is at least two to three orders of magnitude larger than the time scale involved for switching, which means that a power consumption relative to the correction is acceptable and not excessive.

The timing of the control signals with respect to each cell electrode group, and in particular the timing of the individual pulses, may be achieved by synchronizing the generation of consecutive driving pulses so as to be delayed by about one quarter of a full period, e.g. T/4. Various known techniques may be used to do this, including time-demultiplexing of a higher-frequency pulse train (e.g. 4-to-1 time-demultiplexing means), by replicating a generated master control signal and phase delaying the replica control signals, accurate clocking of the rising/falling edges of each pulse by a central timer unit, etc. Furthermore, it is possible to deliver a compound pulse sequence of discrete pulses instead of a single continuous pulse, using for example pulse width modulation schemes.

In embodiments of the invention providing negatively charged scattering particles, positive voltage pulses are generated, whereas for positively charged scattering particles, negative voltage pulses are used. If in embodiments of the invention both positively and negatively charged particles groups are provided, e.g. a dual particle dispersion comprising charged scattering particles and oppositely charged absorbing particles, a superposition of both positive and negative voltage pulses is appropriate, which may differ in magnitude and duty cycle in function of electrophoretic mobility of each particle group.

Besides, it is possible to accommodate to the two other electrode configurations, Configuration II and Configuration III, presented in FIG. 5. To do this, the duty cycle of driving pulses may be adapted, e.g. during calibration, for each control signal separately, e.g. by shortening or lengthening the driving pulse lengths. By way of example, electrode configuration "Configuration II" is characterized by a longer diagonal distance between cell electrodes belonging to groups 7C and 7B, as well as between cell electrodes of groups 7D and 7A, and by a shorter diagonal distance between cell electrodes belonging to groups 7A and 7C, as well as between cell electrodes of groups 7B and 7D, when compared to the corresponding distances in the first electrode configuration "Configuration I". This change of diagonal distances between adjacent cell electrode groups in transport direction can be compensated by increasing the driving pulse lengths/duty cycles delivered to the first and second electrode group 7A, 7B and by simultaneously decreasing the driving pulse lengths/duty cycles delivered to the third and fourth electrode group 7A, 7B, relative to the common duty cycle for the driving pulses of all control signals as presented in FIG. 10. The resulting movement of sets of charged scattering particles is along diagonals of different inclination angles with respect to the substrate faces (oblique planes in three dimensions). Regarding the third electrode configuration "Configuration III", one transfer of a set of charged scattering particles is done vertically in the surface-normal direction only, e.g. the transfer between proximity regions of cell electrodes of groups 7A and 7C. The lack of lateral movement during this transfer step is compensated by the larger lateral displacement during a subsequent transfer step between proximity regions of cell electrodes of groups 7B and 7D. Here too, the length/duty cycle of driving pulses to be delivered to one group of cell electrodes can be shortened (e.g. the third group 7C), whereas the length/duty cycle of driving pulses to be delivered to another one group of cell electrodes can be lengthened (e.g. the fourth group 7C) in comparison to the driving pulse lengths in FIG. 10, which are equal for all four control signals.

Pulses of the control signals driving the cell electrodes of each group may have a peak voltage level ranging between 10 V and 100 V, for inducing electric force fields with magnitudes ranging between 0.5 to 5.0 MV/m. Besides, driving pulses may be generated in the digital domain or in the analogue domain. For the latter pulses may have different shapes, e.g. Gaussian shapes. The control signals for driving each group of cell electrodes may be generated by a driver unit of the optical element and may be delivered to the cell electrodes via electrical wires and/or a bus bar system.

In a third aspect the invention relates to a switching method for switching the a cell or cells of the optical element from a second optical, non-scattering state back to a first optical, scattering state.

As for the switching to the non-scattering state, the charged scattering particles are collectively displaced by electrophoresis also for the switching to the scattering state. Their motion, however, is now directed from the confinement region(s) towards and into the transport region. Yet, the transport of charged scattering particles is performed such that the confinement region(s) are not completely emptied and a homogenous distribution of scattering particles throughout the cell is approximated. To achieve this, the method for switching the cell of the optical element to the scattering state is comprising two stages of homogenization; a first stage directed to a lateral transport of the scattering particles to laterally distribute the scattering particles, followed by a second stage directed to a spreading of the laterally transported scattering particles during the first stage in both the lateral and surface-normal direction. The second stage of spreading is dispersing the sets of charged scattering particles initially formed and transported during the first stage, thereby contributing to a homogenization of the scattering particles across the cell volume. Electrophoretic conditions for lateral displacement during the first stage are induced in the cell in the same way as for the switching method to the non-scattering state, except that the generated electric force fields shift in the opposite direction, this opposite direction being the lateral transport direction for the present switching method. Electrophoretic conditions for spreading during the second stage are induced in the cell by superimposing two electric force fields generated as for the first stage, but shifting into opposite directions (e.g. a shifting force field and the force field obtained therefrom by direction reversal and half time period delay), resulting in a total electric force field that, on time-average, is substantially zero. This property is desirable because a nearly homogenous distribution of scattering particles should not be affected much by the spreading process during the second stage.

The second stage process amounts to repeatedly splitting a number of scattering particles in the extended neighborhood of cell electrodes located on only one of the first and second substrate and combining the splits of two adjacent cell electrodes (of different groups) in a downward or upward movement towards a cell electrode located on the other one of the first and second substrate. Therefore, the second stage has a mixing and redistribution effect. The second stage process is stationary only if the scattering particle concentration in the vicinity of each cell electrode is approximately equal.

Evidently, the switching method to the scattering state is not the only way of obtaining a redistribution of the scattering particles across the cell. A homogenization purely based on diffusion of the scattering particles is an alternative but very slow solution.

To generate the time-varying and shifting electric force fields of the first stage, control signals are provided sequentially to the different groups of cell electrodes, one group at a time. In addition thereto, the control signals are alternately applied to a group of cell electrodes located on the first substrate and located on the second substrate, respectively. With regard to the generation of the electric force fields for the second stage, control signals are alternately applied to both groups of cell electrodes located on the first substrate and then to both groups of cell electrodes located on the second substrate, respectively For the second stage shorter driving pulses as compared to the driving pulses used during the first stage or while switching to the non-scattering state are typically used, because scattering particles in the cell region between the electrodes are mainly oscillating up and down during the second stage, rather than being moved to a collection region in the proximity of the addressed cell electrode. The shorter driving pulses have the effect that the scattering particles are not reaching the proximity region underneath or above the cell electrodes after each pulse, thereby preventing gathering of the scattering particles and thus a deviation from a targeted homogenous distribution for the scattering particles.

An exemplary method for switching a cell of the optical element from the second optical state, e.g. the non-scattering state, to the first optical state, e.g. the light-scattering state, is now explained with reference to FIG. 11, which shows a timing diagram for the control signals supplied to each of the groups of cell electrodes. In the timing diagram, each control signal is associated with one of the cell electrode groups. The control signals, from top to bottom, are for Group B, Group C, Group A, and Group D, and each control signal comprises a sequence of driving pulses, e.g. a pulse train, e.g. a pulse train of voltage pulses. The first m time periods correspond to the first stage and the remaining (M-m) time periods correspond to the second stage. During the first stage, driving pulses of the control signals are delivered in exactly the same way as has been explained previously with reference to FIG. 10, except for the fact that the order in which the cell electrode groups are addressed is reversed and the first driving pulse is delivered to the cell electrode group 7B corresponding to control signal Group B. Hence, all the features relating to the driving pulses, e.g. the length of pulses, their potential overlap, etc., are also applicable to pulses during the first stage. The reversal achieves that the generated electric force fields are shifting in the opposite direction and lateral transport of the charged scattering particles is from the confinement region towards the transport region. Starting with the second stage, the number of delivered pulses per time period is multiplied for each control signal, e.g. doubled in the timing diagram of FIG. 11. Therefore, two shorter pulses are delivered to each cell electrode group per time period T, e.g. two driving pulses having a duty cycle of one eighth of the time period (e.g. T/8) are delivered instead a single driving pulse with duty cycle of a quarter of the time period (e.g. T/4) during the first stage. Furthermore, the control signals in respect of the two cell electrode groups located on a same substrate of the pair of substrates are synchronized to deliver time-aligned driving pulses simultaneously to the cell electrodes of both groups, e.g. control signals for Group A and Group B are synchronized in FIG. 11, as well as control signals for Group C and Group D. The delivery of the driving pulses of a set of synchronized control signals thus completely overlaps in time. Further, the control signals of the first set of synchronized control signals and the second set of synchronized control signals are applied alternately, such that a pulse-free time interval with respect to one set of synchronized control signals corresponds to a time interval of pulse delivery with respect to the other one set of synchronized control signals.

Figure 11:
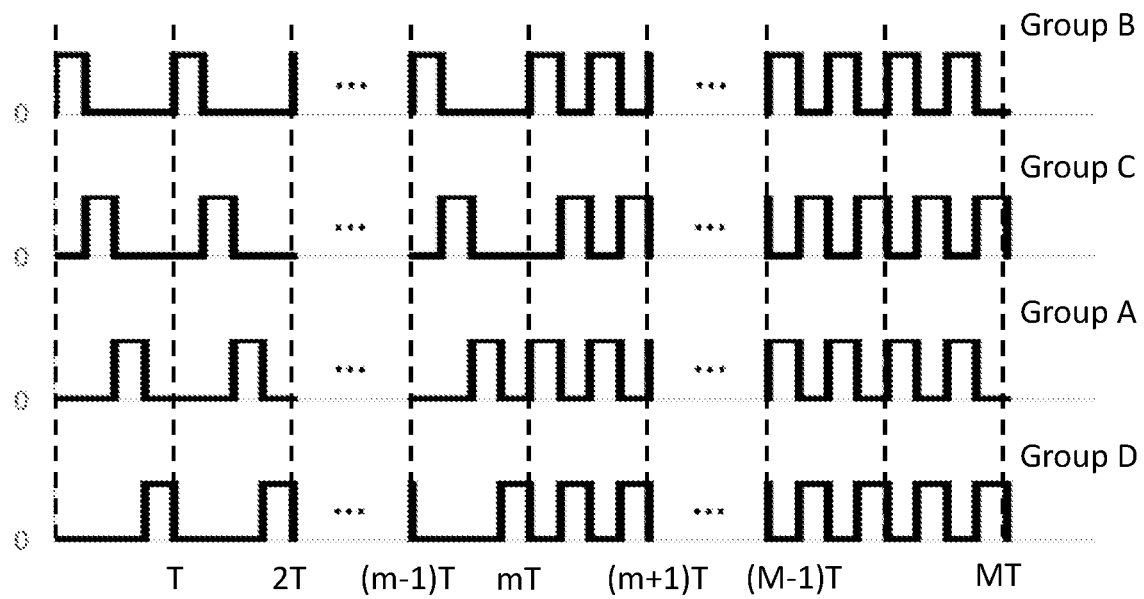
FIG. 11 is a timing diagram for the control signals to be received by the cell electrodes of a switchable optical element, for switching the optical element from the second optical state back to the first optical state, in accordance with embodiments of the invention.

The switching method for switching of the cell of the optical element to the light-scattering, first optical state may comprise less time periods related to laterally transporting the scattering particles during the first stage than the number of time periods spent on laterally transporting the scattering particles when switching the cell to non-scattering state, e.g. m<N in FIGS. 10 and 11. For instance, scattering particles may only be laterally transported half way through the transport region (e.g. by selecting m=50 and M=150 in FIG. 11), the lacking presence of scattering particles in the other half of the transport region being overcome by the subsequent forced mixing and spreading of the scattering particles during the second stage.

In switching methods between optical states of the cell(s) of the optical element, it is not essential which cell electrode groups are the first to be addressed in each time period when electrophoretic conditions for lateral transport of the scattering particles are induced; only their relative ordering matters. Therefore cyclic permutations of the sequence of control signals are allowed. For instance, possible sequences for the control signals in FIG. 10 are, in addition to the sequence Group A-Group C-Group B-Group D as indicated, the following sequences: Group C-Group B-Group D-Group A; Group B-Group D-Group A-Group C; Group D-Group A-Group C-Group B. Likewise, reversal of these sequences entail lateral transport of the charged scattering particles in the opposite direction, e.g. from the confinement region towards the transport region when switching the cell(s) from the non-scattering state back to the light-scattering state. More particularly, equivalent reversed sequences are: Group A-Group D-Group B-Group C, Group D-Group B-Group C-Group A, Group B-Group C-Group A-Group D, and Group C-Group A-Group D-Group B. Furthermore, the lateral transport of charged scattering particles does not depend on a particular labelling of cell electrodes groups as Group A, B, C and D; for example, one may relabel the cell electrode groups by exchanging labels A↔B and/or C↔D. The sequences obtained under any such relabelling of cell electrode groups are all equivalent in the sense that the resulting lateral transport conditions are the same (i.e. invariance under relabelling).

Figure 15:
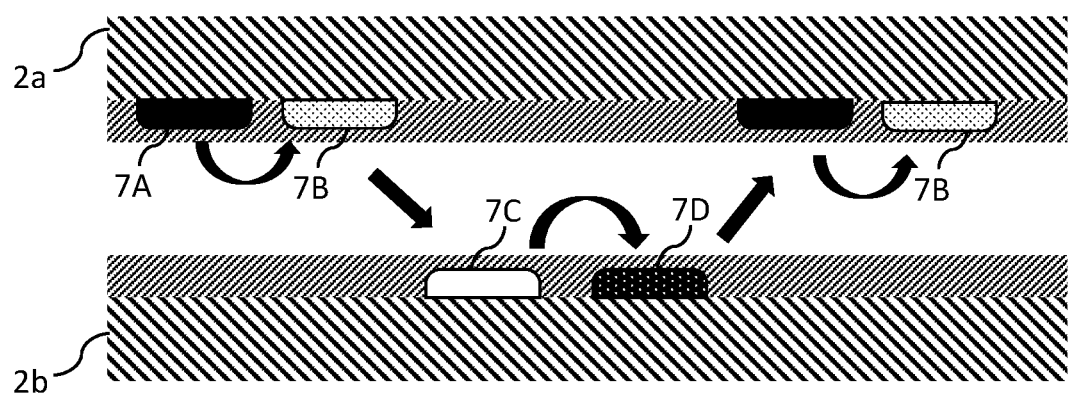
FIG. 15 shows a portion of a cross-sectional view of a switchable optical element, explaining a further cell electrode configuration in accordance with embodiments of the invention.

The above switching methods relate to embodiments in which cell electrodes of the first and/or second group of cell electrodes on the first substrate are interposed between adjacent cell electrodes of the third and fourth group of cell electrodes on the second substrate, when viewed from the top or bottom of the optical element. Expressed in terms of projections, this means that perpendicular projections of cell electrodes of the first and/or the second group onto the second substrate are flanked by adjacent cell electrodes of the third and fourth group. There exist alternative embodiments in which no such perpendicular projection of cell electrodes of the first and second group onto the second substrate is to be found flanked by adjacent cell electrodes of the third and fourth group, but instead is flanked by a cell electrodes of either the third or the fourth group and another perpendicular projection of cell electrodes of the first and second group onto the second substrate. Such an alternative embodiment is illustrated in FIG. 15, showing a cross-sectional view of the optical element as in FIG. 5, with the difference that now pairs of cell electrodes of the first and second group (7A, 7B) are interleaved with pairs of cell electrodes of the third and fourth group (7C, 7D) in the lateral direction of the cell. In the present embodiment, the order in which pulses are delivered to the different cell electrode groups when switching the optical state of the cell differs from the pulse delivery order of the foregoing embodiments. A sequence of control signals, as indicated by arrows in FIG. 15, enables lateral transport of charged scattering particles (not shown) from the left side of the cell towards a confinement region on the right side of the cell, whereby the optical element is switched from the light-scattering state to the non-scattering state, e.g. the transparent state. Denoting the pulse sequence by the groups of cell electrodes addressed by the pulses, the following order, up to a relabelling of cell electrode groups, results: Group A-Group B-Group C-Group D, or cyclic permutations thereof. Under a relabelling operation A↔B and a cyclic permutation, the following sequence is equivalent to the preceding one: Group A'-Group C'-Group D'-Group B'. Similarly, or additionally, one can exchange labels C↔D. Eventually, by reversing the above sequences, one obtains the time-reversed lateral transport conditions for the scattering particles, i.e. lateral scattering particle transport in the opposite direction, e.g. from the confinement region on the right side of the cell towards the transport region of the cell, on the left side relative to the confinement region, which corresponds to the switching of the optical element from the non-scattering state to the light-scattering state. For the above two sequences, reversal leads to the following equivalent orders in which the driving pulses are delivered to the cell electrode groups: Group A-Group D-Group C-Group B and Group A'-Group C'-Group D'-Group B'.

In a further aspect, the invention is directed to a smart window comprising at least one switchable optical element according to embodiments of the first aspect.

In embodiments in which scattering particles are dispersed in a non-polar solvents with surfactant molecules, e.g. dodecane and 1-2 wt. % of OLOA 11000 (Chevron Oronite™) as surfactant, the lateral transport conditions for the scattering particles can be altered if the concentration of surfactant molecules exceeds the critical micelle concentration (CMC). At the CMC point and beyond, e.g. 0.0058 wt. % for the surfactant and non-polar solvent in the example just given, inverse micelles start forming in the solvent and inter-micellar collisions can lead to a charging of the inverse micelles. In experiments with 1-2 wt. % of OLOA 11000 in dodecane, charged inverse micelle concentrations of about $10^{20}$ m$^3$ are observed. In the altered lateral transport conditions, a forward component and a backward component coexist while driving the cell electrode configuration. The emergence of a backward component is a complex electro-hydrodynamic phenomenon, of which the fundamental aspects are illustrated step-by-step in FIG. 12. Steps a) to d) correspond to one quarter of a full (cycle) period, e.g. the time interval [T/4, 2 T/4], during which one group of cell electrodes is addressed and a positive voltage pulse delivered. The cell electrode configuration in FIG. 12 is identical to Configuration I of FIG. 5, in which an exemplary height of the cell 5 may be about d=50 μm, a width w of the finger-like electrodes 7A-7D may be approximately w=60 μm, and a center-to-center separation between adjacent cell electrodes in the lateral direction of the cell (of different groups, e.g. 7A-7B or 7C-7D) is approximately s=140 μm.

Step a) relates to the moment of time immediately following the delivery of a positive voltage pulse to currently addressed cell electrode group 7C, while the cell electrodes of the remaining groups 7A, 7B, and 7D are held at zero potential. A first fraction of charged scattering particles 6 (negatively charged in this example) is concentrated in the space directly underneath the cell electrodes of group 7A, which is the group of cell electrodes that has been addressed by the driving unit during the step preceding step a), such that the electric field generated by delivery of the positive voltage pulse to cell electrodes of group 7A exerted an attractive force onto the scattering particles 6. The finite mobility of scattering particles 6 prevents them from instantly rearranging under the newly generated electric field as the positive pulse is now delivered to addressed cell electrode group 7C. Furthermore, a second fraction of charged scattering particles 6, which may include the majority of the charged scattering particles in the cell 5 in relation to the scattering particles that belong to the first fraction, is transiently distributed in the cell volume. Inverse micelles are formed from the surfactant molecules, which can carry and stabilize the charge of the scattering particles. As a result, positively charged inverse micelles 16p and negatively charged inverse micelles 16n are also present in the cell 5 and typically have a higher electrophoretic mobility as compared to the charged scattering particles 6. In the case where the negatively charged inverse micelles 16n are responsible for the transfer of negative charges onto the scattering particles, the population of positively charged inverse micelles 16p is generally more abundant than the negatively charged one. For the same reasons given above with respect to the scattering particles, also the charged inverse micelles 16n, 16p do not adapt instantly to electric potential change and initially remain in their preceding configuration, as shown in step a), namely a cloud of negatively charged inverse micelles 16n being formed underneath the previously addressed cell electrodes of group 7A and distinct, isolated clouds of positively charged inverse micelles 16p being collected in the vicinity of each one of the grounded cell electrode groups 7B, 7C, and 7D which have not been addressed in the step before.

As illustrated in step b), the positively charged inverse micelles 16p are repelled from the currently positively charged cell electrodes of group 7C under the influence of the newly generated electric field and the negatively charged inverse micelles 16n are repelled from the now grounded cell electrodes of group 7A. The positively charged inverse micelles 16p tend to spread out and travel towards the currently unaddressed cell electrodes of groups 7A, 7B, and 7D, whereas the negatively charged inverse micelles 16n are attracted towards the currently positively charged cell electrodes of group 7C. The negatively charged scattering particles experience the new electric field in a way similar to the negatively charged inverse micelles 16n. In view of their smaller mobility and the reduction of the electric field strength upon screening of the cell electrodes by the charged inverse micelles, however, the scattering particles 6 are displaced more slowly as compared to the negatively charged inverse micelles 16n. Scattering particles 6 which lag behind the faster moving negatively charged inverse micelles 16n are also schematically illustrated in step c).

Step c) further explains the onset of a viscous flow of the non-polar solvent. The charged inverse micelles 16n, 16p not only experience a drag while being driven by electrophoresis, the viscosity of non-polar solvent (e.g. η~1 mPa s for dodecane) also leads to a transfer of momentum from the charged inverse micelles to the surrounding fluid, setting the fluid locally into motion. The fluid flow caused by the negatively charged inverse micelles 16n dominates over the fluid flow caused by the positively charged inverse micelles 16p, because the former are experiencing an electrical field of increasing strength as they move towards the cell electrodes of group 7C and therefore transfer part of their momentum within a small fluid volume, whereas the latter spread out more significantly while moving and momentum transfer part occurs over a relatively large fluid volume.

In d) step the locally developing fluid currents develop into a globally structured fluid rolls or vortices inside the volume of the cell 5. These vortices persist, due to inertia of the fluid mass, even if the charged inverse micelles 16n, 16p have reached a short-term electrostatic equilibrium distribution. However, the slower scattering particles have not yet reached their electrostatic equilibrium distribution and therefore are strongly affected by the emerging fluid vortices. In fact, on their path towards the currently activated cell electrode group 7C, a significant part of the charged scattering particles of the first fraction is deviated by fluid vortices and may drift back into the cell volume. A remaining part of the charged scattering particles of the first fraction, together with a part of the charged scattering particles of the second fraction, is still attracted into the neighborhood of the activated cell electrode group 7C and accumulates there. This amounts to a forward component of the lateral transport of scattering particles. On the other hand, a majority of the charged scattering particles of the second fraction is caught in the fluid vortices and drawn backwards relative to the transport direction resulting only from electrophoresis. This amounts to an effective backward component of the lateral transport of scattering particles. It is noted that the fluid vortices may destroy the correlation between scattering particles that have been attracted to a cell electrode during one quarter of a period and scattering particles that are attracted to a cell electrode during the next quarter of a period and idem for the deviated scattering particles. Hence, the forward and backward components are obtained on average, averaging out the movement of scattering particles over many subsequently applied pulses. Moreover, the transport conditions induced by the delivery of voltage pulses to the cell electrode configuration are still in a lateral direction, although it is now possible to have a superimposition of a lateral forward component and a lateral backward component for the transport of scattering particles in the transport region of the cell. There are generally no long term correlations between the forward and the backward component and the dominant component will dictate the long-term transport direction of scattering particles, e.g. eventually transporting the scattering particles to the forward edge (e.g. sealing wall in forward direction) or to the backward edge (e.g. sealing wall in backward direction) of the cell.

Step e) describes the start of the following quarter period, e.g. the time interval [2 T/4, 3 T/4], during which cell electrode group 7B is the addressed group of cell electrodes that receives a positive voltage pulse. Step e) also described the distribution of charged scattering particles 6 and charged inverse micelles 16n, 16p obtained in the transport region of the cell 5 at the end of the preceding voltage pulse. Depending inter alia on the dissipation rate of fluid flow in the cell and the rate at which the control signal pulses are delivered to the cell electrode configuration, the fluid vortices may have collapsed and dissipated into heat to a large extent in some embodiments, whereas in other embodiments the fluid vortices may not dissipate completely before a new control signal phase (i.e. new applied pulse) starts, leading to persistent fluid vortices across control signal phases. Steps a) to d) are now repeated in an analogous manner, except that the configuration shown in step e) correctly reflects the initial conditions (for fluid and particles) in the cell at the time the next pulse is delivered. Besides, the steps for each new quarter period are directly derivable from the steps a) to d) already described, simply by using the set of symmetry rules that are applicable to the exemplary cell electrode configuration in FIG. 12 as a whole. Step e), for example, corresponds to the beginning of the next quarter of a period and is directly derivable from step a) through application of a discrete vertical mirror symmetry, followed by a discrete translation symmetry by +P/4, wherein P is the lateral extent of one repeating cell unit, consisting of four adjacent cell electrodes, one of each group.

Figure 9:
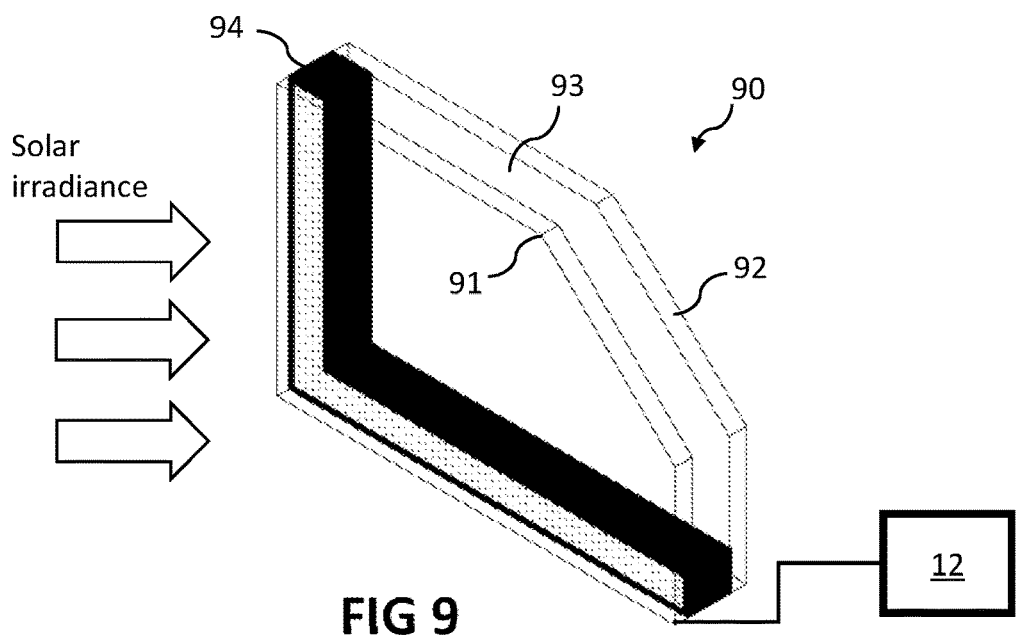
FIG. 9 is a perspective cut-away view of a smart window according to an embodiment of the invention.

Referring to FIG. 9, a smart window 90 is shown in cut-away view. The smart window can be used in office buildings, e.g. as solar protective glazing, to further reduce the smart window contribution to solar heating (and decrease the integrated solar energy transmission), thereby allowing for a reduction in the power consumed by traditional HVAC (heating, ventilation and air-conditioning) installations.

The smart window 90 is configured as an insulating glass unit (IGU) and comprises a first, outer window pane 91, being directly exposed to the incident radiation, e.g. solar irradiation, and a second, inner pane 92, which is oriented towards the interior of the building, e.g. a room, hall, or office area. A spacer structure 94 is arranged between the first window pane 91 and the second window pane 92 so as to spatially separate the panes 91, 92 from each other and to leave a space 93, e.g. gap, between them.

The window panes can be shaped in various ways, e.g. shaped rectangular, trapezoidal, etc. The space 93 may be filled with a gas, e.g. air or Argon, to provide increased thermal insulation. The spacer structure 94 may be a spacer bar, e.g. a hollow, lightweight spacer bar made from aluminum, in which the hollow comprises a drying agent to prevent the formation of moisture on and/or to remove moisture from the window. Lateral faces of the spacer structure 94, which are in contact with the window panes 91, 92, may be provided with a sealant, e.g. polyisobutylene, and a further sealant may be provided at an outer face of the spacer structure 94, e.g. the face opposite to the spacer 93. The further sealant may comprise silicone or urethane material.

The inner window pane 92 may be a conventional glass pane or a coated glazing, e.g. a glass pane with a low-E coated surface disposed towards the space 93. The outer window pane 91 comprises at least one switchable optical element according to embodiments of the first aspect. Furthermore, the outer window pane 91 may comprise a protective and/or reinforcing layer on an outer surface thereof (e.g. surface opposite to the space) to prevent damage and thermal stress. The low-E coating can be applied to the outer window pane 91 instead of being provided on the inner window pane, e.g. the low-E coating may be provided on the substrate opposite to the space 93 such that it is still covered by the protective and/or reinforcing layer on the outer surface.

A driver unit 12 may be coupled to switchable optical element in the outer window pane 91 via electrical cabling. The driver unit 12 may be located remotely from the smart window 90, e.g. being part of a window frame receiving the smart window 90, or may be integrated into the smart window 90, e.g. incorporated into, or attached to the spacer structure 94. Moreover, the driver unit 12 is configured for generating and sending control signals for switching of the at least one optical element, where these control signals are received by the cell electrodes of the different groups of cell electrodes. For example, the driver unit 12 may comprise additional functional units, such as a timing unit for the timing of the control sequences, a memory unit for storing instructions related to operating the at least one optical element of the smart window, and for storing control sequences, or references thereto, and a processing unit (e.g. processor, microcontroller) for determining which control sequence is to be generated for a specific cell electrode group in the events of switching from the first optical state to the second optical state, or vice versa, and optionally, also for correcting an optical state. In embodiments of the invention relating to the smart window 90, the driver unit 12 is thus adapted for carrying out the steps of a method for switching of the at least one optical element according to the second aspect.

A computer program may be stored/distributed on a suitable medium, such as an optical storage medium or a solid-state medium, but may also be distributed in other forms, such as via the Internet or other wired or wireless telecommunication systems. The computer program may thus be stored and/or loaded into a memory unit of the driver unit 12 or in communication with the driver unit 12. The loaded computer program may constitute an executable software module comprising instructions, which when carried out by the driver unit 12, perform the steps of methods with respect to embodiments of the second aspect.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

In some embodiments of the invention, for example, all the optical elements comprised by a smart window are switched in parallel, e.g. a collective switching operation is performed by all the optical elements of the smart window. This has the advantage that the electronic circuitry for addressing the optical elements and for applying the switching signals is less complex and can be made fast. However, embodiments of the invention are not limited to parallel switching of the plurality of optical elements in a smart window and serially switching of single optical elements, or of groups of optical elements, is within the technical skills of the technically skilled person.

In same or other embodiments of the invention, the optical elements of the smart window are individually addressable, or are addressable in small blocks, e.g. blocks comprising between four and sixteen optical elements. These individually addressed optical elements or blocks may function as electrokinetic pixels of the smart window. As a result, decorative patterns or informative content can be displayed as text or graphics without requiring active illumination, e.g. backlit LEDs. As a particular example thereof, a smart window may be in the scattering state during working hours to prevent excessive heating of a room behind the smart window, but setting an optical element, or a block of optical elements, to a non-scattering transparent state to provide a clear area on the window, which functions as a "door" viewer or peephole in an otherwise opaque window surface. Such a clear area may also be programmed to shift in position over time, which may be useful to provide direct sunlight to plants or solar-powered devices in a room, as a function of solar elevation angle over time. Moreover, office buildings with smart windows that are illuminated overnight may be programmed to display informative content to people walking or driving past the building, e.g. company names and office hours, advertisement, recruitment information, decorative art, etc.

The present invention further relates to a smart switchable mirror comprising an optical element according to embodiments of the first aspect, the optical element comprising a reflective layer on one of the substrates of the pair of substrates.

For example, embodiments of the invention directed to a switchable optical element akin to the optical element 40 of the embodiment referred to in FIG. 4 may be used as or in a smart mirror, provided that the partially reflective coating layer 9 is adapted to be fully reflective over a predetermined wavelength range, e.g. over the visible wavelength range. The reflective layer can be a metallic layer, e.g. a thin layer of aluminium, gold, or silver applied to the backside of the bottom substrate. Alternatively, a dielectric reflective coating or a combination of dielectric reflective coatings may be provided on the bottom substrate, for example one or more dielectric multi-layered material stacks may be provided on the bottom substrate to obtain good reflectivity over a wide range of wavelengths. It is also possible to selectively reflect wavelengths that are contained in one or more narrower wavelength bands, e.g. colour bands for reflecting only light from one or more colours selected from the list of ultraviolet, blue, green, red, and infrared light. Embodiments of the smart mirror can thus encompass wavelength-selective mirrors as well as broadband mirrors.

A smart mirror may be used to selectively switch between a diffuse reflecting state and a specular reflecting state as first and second optical states respectively. Alternatively, the smart mirror may be a wall-integrated mirror which can be selectively switched on and off. Under usual room illumination, e.g. a white light source approximating the solar spectrum, the smart mirror may be in the first optical state and scatter the ambient light of the room. The resulting opaqueness of the mirror gives no or little visual distinction of the smart mirror as compared to a surrounding wall, e.g. a white wall for a milky first optical state, although colourings may be engineered by tuning the optical properties of the scattering particles. Additionally, a smart mirror comprising a plurality of independently addressable switchable optical elements may be programmed to display informative content to the user, e.g. textual or graphical information such as weather forecast information, personal agenda data, time, or others.

In embodiments relating to the different aspects of the invention, the particle dispersion may comprise a further group of charged particles, in addition to the charged scattering particles. A further group of charged particles may have optical scattering properties similar to the scattering particles described previously, but may be matched to a different range of wavelength. This can improve a spectral bandwidth over which optical scattering is achieved efficiently. However, the further group of particles may also be directed to a different optical property, e.g. to absorption. A particle dispersion comprising scattering particles as well as absorbing particles, e.g. dyed PMMA particles, has the advantage that, in addition to the optical state of (back) scattering/translucence, a further optical state related to dimming can be controlled in an independent manner. For instance, if the transmitted scattered light is disturbingly bright during daytime, e.g. for night workers sleeping over day or when taking a nap, but the reduced heat absorption of the window due to light scattering is still desirable for comfort, dimming functionality can be independently switched on or off. If the further group of charged particles are also directed to scattering of light, the optical state of scattering or translucence can be controlled at a finer level, e.g. up to four different degrees of scattering (e.g. percentages of haze or translucence) can be set, including the clear state free of scattering.

The further group of dispersed charged particles may have a different shape, size, or charge (e.g. more positive or more negative, different polarity) as compared to the first scattering particles such that their electrophoretic mobility differs from the mobility of the first scattering particles. A different electrophoretic mobility allows to concentrate one particle group in the confinement region of the optical element, whereas the other one is too inert to follow the directed motion of the former and remains substantially immobile. Alternatively, a further group of dispersed charged particles with charge polarity opposite to that of the scattering particles may also show good electrophoretic mobility, which allows to separate the group of charged scattering particles from the further group of oppositely charged particles and confine them into two distinct confinement regions of the cell, e.g. two confinement regions bordering opposite cell boundaries, e.g. lateral sidewalls of the cell volume that lie opposite to each other.

A further group of dispersed charged absorbing particles may bring about a significant increase in the absorbance value of an optical element or a smart widow comprising at least one optical element in accordance with embodiments of the invention. Achievable absorbance values may be switched between 5% for the optically clear state, e.g. substantially all absorbing particles being concentrated in the confinement region(s), and 60% for a third optical state characterized in that the group of absorbing particles substantially free, e.g. not confined to the confinement region (s), so as to spread over the entire volume of each cell. Embodiments of the present invention may also include a dispersion of absorbing particles that are not carrying a charge, i.e. which are electrically neutral. In such embodiments, the absorbing particle concentration may be a predetermined concentration to obtain a predetermined permanent degree of absorbance, e.g. for smart windows with a constant shading functionality. Further added particle dispersions, carrying an electrical charge or being electrically neutral, may contain particles that have a black and/or coloured appearance to the observer. This may be useful in embodiments of the invention in which, for example, a coloured tint of the smart window instead of a translucent appearance of the window after switching to the non-scattering state is preferred, or where a black appearance can guarantee more privacy. Smart windows or optical articles that contain a plurality of cells with further added particles can also be used to display coloured or black/white images by individually addressing and controlling the switching state of each cell in a manner similar to pixels of a screen.

Figure 13:
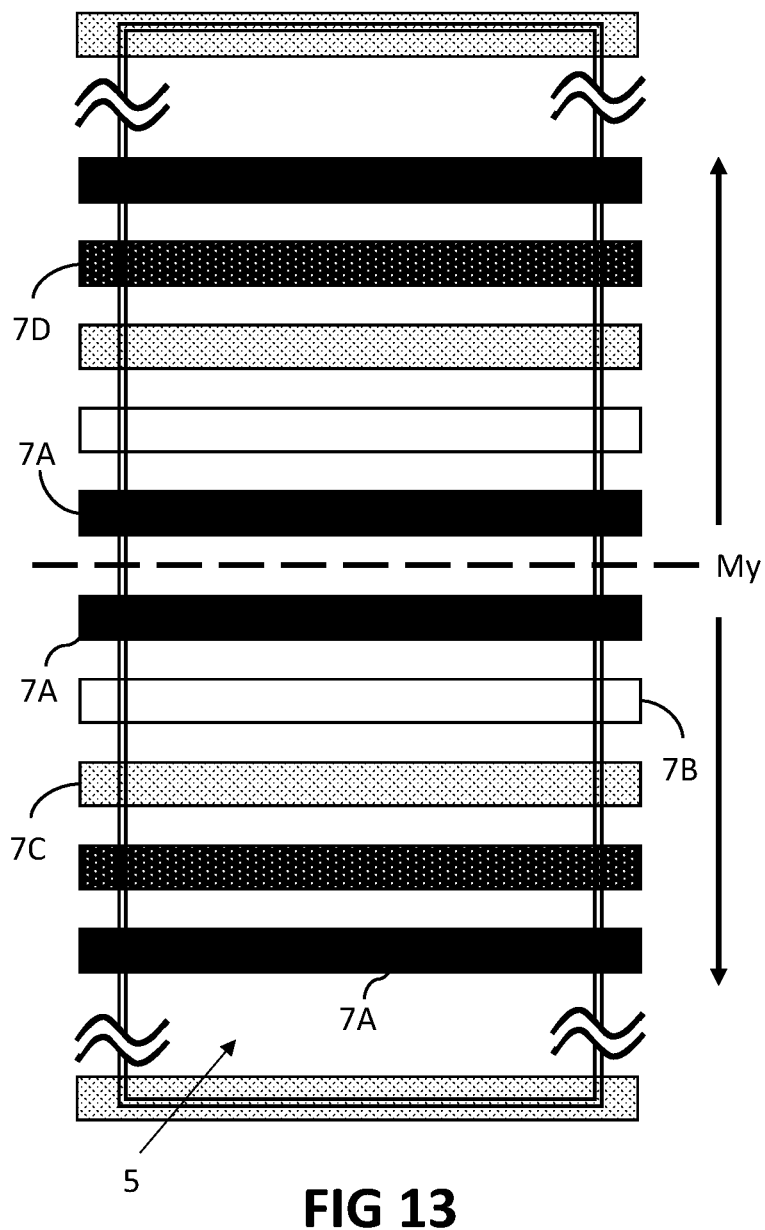
FIGS. 13 and 14 are examples of cell electrode configurations that can be used in embodiments of the invention to obtain spatially varying transport directions of charged scattering particles across the cell.

In embodiments of the invention, the alternating sequence of cell electrode groups of the cell electrode configuration may not be continuous across the whole cell. FIG. 13 gives an example of a cell electrode configuration, in which the alternating sequence is discontinuous across the mirror plane My. The cell electrode configuration is effectively split into an upper set and a lower set of cell electrodes, wherein the respective groups of the cell electrodes are again interleaved for both the upper set and the lower set. The lower set of cell electrodes can be obtained from the upper set of cell electrodes by mirror reflection at the centre plane My of the cell volume 5 so that two cell electrodes of the group 7A are next to each other at the mirror plane. As a result, charged scattering particles can be transported laterally in opposite directions, indicated by the two arrows in FIG. 13, depending on whether their initial position was in the upper or lower section relative to the mirror plane My of the cell. Accumulation of the transported scattering particles is thus possible in the vicinity of the top wall and the bottom wall of cell volume 5 at the same time, giving rise to two oppositely located confinement regions. Embodiments as illustrated with reference to FIG. 13 have the advantage that a transport time for scattering particles, and thereby also the cell state switching time, can be shorter by about a factor of two.

Figure 14:
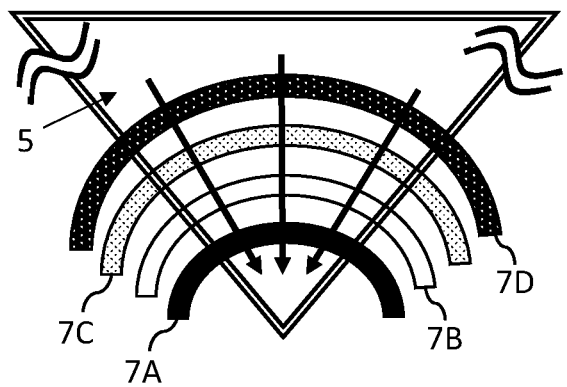

FIG. 14 is an example of a cell electrode configuration in which at least a subset of cell electrodes is curved. In this example, cell electrodes of alternating groups are arranged as arcuate paths on the upper and lower substrate respectively and have increasing curvature towards the bottom apex of the cell volume 5. They may be arranged concentrically with a common focal point in the neighbourhood of the bottom apex. Such a cell electrode configuration can be used in embodiments of the invention, in which it is advantageous to confine the scattering particles into a smaller space, e.g. into a corner of the cell volume instead along an extended line or sidewall, which may further reduce their residual visibility after confinement. The cell volume 5 can be shaped as a cylinder with triangular base, but is not limited thereto; for instance, focussing can also occur in the presence of a straight boundary.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A switchable optical element for use in a smart window, comprising
   a pair of substrates disposed facing each other and separated from each other,
   at least one cell arranged between the pair of substrates and laterally extending between the pair of substrates, and comprising a dispersion of charged scattering particles,
   a cell electrode configuration provided on said pair of substrates and organized into groups of cell electrodes with cell electrodes of a first group being interleaved with cell electrodes of a second group on a face of a first one of the pair of substrates and cell electrodes of a third group being interleaved with cell electrodes of a fourth group on a face of a second one of the pair of substrates, said cell electrode configuration on said pair of substrates further defining a transport region and a confinement region of said at least one cell, the transport region being contiguous with the confinement region,
   wherein the at least one cell is switchable between a first optical state and a second optical state, the first optical state being associated with a light-scattering, distributed configuration of the scattering particles within the transport and confinement region of said at least one cell, and the second optical state being associated with a non-scattering, confined configuration of the scattering particles within the confinement region of said at least one cell,
   wherein a relative arrangement between the cell electrodes of the first and second group on the first substrate relative to the cell electrodes of the third and fourth group on the second substrate is adapted for inducing lateral transport conditions for the scattering particles in the at least one cell, from the transport region towards the confinement region, when control signals for switching of the at least one cell between the two optical states are received by the electrode configuration, and
   wherein the transport region of the at least one cell and the therein induced lateral transport of the charged scattering particles extends over at least a distance corresponding to two adjacent cell electrodes of one same group of said groups of cell electrodes in the lateral direction of the cell.

2. The optical element according to claim 1, wherein the confinement region of the at least one cell corresponds to a lateral confinement region, extending between a lateral boundary of the cell, or a limited portion thereof, and the transport region.

3. The optical element according to claim 2, wherein a lateral extent of the confinement region corresponds to four to twenty successive cell electrodes in the lateral direction of the cell.

4. The optical element according to claim 1, wherein the confinement region of the at least one cell corresponds to an inner region of the cell, with opposite sides in the lateral direction of induced scattering particle transport being delimited by different parts of the transport region, and the cell electrode configuration further being adapted to induce opposite oriented lateral transport conditions in said different parts of the transport region, delimiting said opposite sides of said inner region.

5. The optical element according to claim 1, wherein the electrodes of one group of cell electrodes, provided on the first one of said pair of substrates, are laterally offset with respect to the electrodes of another one group of cell electrodes, provided on the second one of said pair of substrates.

6. The optical element according to claim 1, wherein the cell electrode configuration is further adapted to induce lateral scattering particle transport conditions such that a transport direction of scattering particles substantially differs in different parts of the transport region.

7. The optical element according to claim 1, further comprising a driving unit for driving the cell electrode configuration of the switchable optical element, the driving unit being configured for carrying out the steps of:
 (i) delivering at least one driving pulse to each group of cell electrodes in only one of the following orders:
  a) first group of cell electrodes, third group of cell electrodes, second group of cell electrodes, fourth group of cell electrodes,
  b) first group of cell electrodes, second group of cell electrodes, third group of cell electrodes, fourth group of cell electrodes,
  c) any cyclic permutation and/or relabeling of cell electrode groups derivable from orders a) or b),
 (ii) repeating step (i) a predetermined number of times to laterally transport towards, and to confine in the confinement region of said cell, the scattering particles.

8. The optical element according to claim 7, wherein the driving unit is further configured for carrying out the steps of:
 (iii) delivering, in a first stage, at least one driving pulse to each group of cell electrodes in only one of the following orders:
  a) first group of cell electrodes, fourth group of cell electrodes, second group of cell electrodes, third group of cell electrodes,
  b) first group of cell electrodes, fourth group of cell electrodes, third group of cell electrodes, second group of cell electrodes,
  c) any cyclic permutation and/or relabeling of cell electrode groups derivable from orders a) or b),
 (iv) repeating step (iii) a predetermined number of times to laterally transport at least a fraction of the scattering particles away from and out of the confinement region of said cell,
 (v) simultaneously delivering, in a second stage, a driving pulse to each electrode located on a first one of the pair of substrates, and a subsequent driving pulse to each electrode located on a second one of the pair of substrates, to further spread the scattering particles over the at least one cell, wherein driving pulses delivered in the second stage are of shorter pulse duration as compared to the driving pulses delivered in the first stage.

9. The optical element according to claim 1, wherein a lateral boundary of the at least one cell is defined by lateral walls provided by a plurality of spacer components disposed between the pair of substrates.

10. The optical element according to claim 1, comprising a plurality of cells arranged and laterally extending between the pair of substrates,
 wherein each cell comprises a dispersion of charged scattering particles and each cell is switchable between the first optical state and the second optical state,
 wherein said cell electrode configuration on said pair of substrates is defining a transport region and a confinement region in respect of each one of said plurality of cells, the transport region being contiguous with the confinement region, and
 wherein the relative arrangement between the cell electrodes of the first and second group on the first substrate relative to the cell electrodes of the third and fourth group on the second substrate is adapted for inducing lateral transport conditions for the scattering particles in each cell, from the respective transport region towards the respective confinement region of that cell, when control signals for switching of the cells between the two optical states are received by the electrode configuration.

11. The optical element according to claim 1, wherein at least one cell of the optical element further comprises a dispersion of charged absorbing particles.

12. The optical element according to claim 11, wherein the at least one cell comprising the dispersion of charged absorbing particles is switchable also between a third optical state and a fourth optical state, the third optical state being associated with a light-absorbing, distributed configuration of the absorbing particles within the transport and confinement region of said cell, and the fourth optical state being associated with a non-absorbing, confined configuration of the absorbing particles within the confinement region of said cell, and
 wherein the electrode configuration is further adapted for inducing lateral transport conditions for the absorbing particles in the at least one cell comprising the absorbing particles, from the transport region towards the confinement region, when control signals for switching of said cell between the third and the fourth optical state are received by the electrode configuration.

13. The optical element according to claim 1, wherein electrodes of a same group of cell electrodes are connected to a common bus bar.

14. A method for switching at least one cell of an optical element from a first optical state to a second optical state,
 said first optical state being associated with a light-scattering, distributed configuration of charged scattering particles within a transport region and a confinement region of said at least one cell, the transport region being contiguous with the confinement region, and said second optical state being associated with a non-scattering, confined configuration of the scattering particles within the confinement region of said at least one cell,
 the optical element comprising a pair of substrates disposed facing each other and separated from each other and the at least one cell being arranged and laterally extending between the pair of substrates and comprising a dispersion of said charged scattering particles, and
 a cell electrode configuration being provided on said pair of substrates and organized into groups of cell electrodes with cell electrodes of a first group being interleaved with cell electrodes of a second group on a face of a first one of the pair of substrates and cell electrodes of a third group being interleaved with cell electrodes of a fourth group on a face of a second one of the pair of substrates, wherein the method comprises the steps of:
(i) delivering at least one driving pulse to each group of cell electrodes in only one of the following orders:
a) first group of cell electrodes, third group of cell electrodes, second group of cell electrodes, fourth group of cell electrodes,
b) first group of cell electrodes, second group of cell electrodes, third group of cell electrodes, fourth group of cell electrodes,
c) any cyclic permutation and/or relabeling of cell electrode groups derivable from orders a) or b),
(ii) repeating step (i) a predetermined number of times to laterally transport towards, and to confine in the confinement region of said cell, the scattering particles,
wherein the charged scattering particles are transported laterally over at least a distance corresponding to two adjacent cell electrodes of one same group of said groups of cell electrodes in the lateral direction of the cell.

15. The method according to claim 14, further comprising the step of switching the at least one cell from the second optical state to the first optical state, including:
(iii) delivering, in a first stage, at least one driving pulse to each group of cell electrodes in only one of the following orders:
a) first group of cell electrodes, fourth group of cell electrodes, second group of cell electrodes, third group of cell electrodes,
b) first group of cell electrodes, fourth group of cell electrodes, third group of cell electrodes, second group of cell electrodes,
c) any cyclic permutation and/or relabeling of cell electrode groups derivable from orders a) or b),
(iv) repeating step (iii) a predetermined number of times to laterally transport at least a fraction of the scattering particles away from and out of the confinement region of said cell,
(v) simultaneously delivering, in a second stage, a driving pulse to each electrode located on a first one of the pair of substrates, and a subsequent driving pulse to each electrode located on a second one of the pair of substrates, to further spread the scattering particles over the at least one cell, wherein driving pulses delivered in the second stage are of shorter pulse duration as compared to the driving pulses delivered in the first stage.

16. The method according to claim 14, wherein subsequently delivered driving pulses are partially overlapping in time, and/or
wherein the driving pulses are voltage pulses and a dc voltage component of the voltage pulses applied to the cell electrodes of the cell electrode configuration during the lateral transport of scattering particles is substantially 0 Volt.

17. The method according to claim 14, wherein the scattering particles of the switchable optical element are dispersed in a liquid continuous phase comprising a non-polar solvent and surfactants at or above the critical inverse micelle concentration in said non-polar solvent, charged inverse micelles in the liquid continuous phase having a higher electrophoretic mobility than the charged scattering particles, and wherein an amplitude of each delivered pulse is selected to generate, via a collective viscous flow of charged inverse micelles moving in response to an electrophoretic force associated with the delivered pulse, a plurality of electrohydrodynamic fluid vortices in the at least one cell, the fluid vortices causing a backward component of the lateral transport of scattering particles in addition to, and superimposing, a forward component of the lateral transport of scattering particles by electrophoresis.

18. The method according to claim 17, wherein the confinement region of the at least one cell corresponds to a disjoint set of two opposite, lateral confinement subregions, each confinement subregion extending between a respective lateral cell wall and the transport region.

19. A smart window comprising
a pair of substrates disposed facing each other and separated from each other,
at least one cell arranged between the pair of substrates and laterally extending between the pair of substrates, and comprising a dispersion of charged scattering particles,
a cell electrode configuration provided on said pair of substrates and organized into groups of cell electrodes with cell electrodes of a first group being interleaved with cell electrodes of a second group on a face of a first one of the pair of substrates and cell electrodes of a third group being interleaved with cell electrodes of a fourth group on a face of a second one of the pair of substrates, said cell electrode configuration on said pair of substrates further defining a transport region and a confinement region of said at least one cell, the transport region being contiguous with the confinement region,
wherein the at least one cell is switchable between a first optical state and a second optical state, the first optical state being associated with a light-scattering, distributed configuration of the scattering particles within the transport and confinement region of said at least one cell, and the second optical state being associated with a non-scattering, confined configuration of the scattering particles within the confinement region of said at least one cell,
wherein a relative arrangement between the cell electrodes of the first and second group on the first substrate relative to the cell electrodes of the third and fourth group on the second substrate is adapted for inducing lateral transport conditions for the scattering particles in the at least one cell, from the transport region towards the confinement region, when control signals for switching of the at least one cell between the two optical states are received by the electrode configuration, and
wherein the transport region of the at least one cell and the therein induced lateral transport of the charged scattering particles extends over at least a distance corresponding to two adjacent cell electrodes of one same group of said groups of cell electrodes in the lateral direction of the cell.

20. The smart window according to claim 19, further comprising a driving unit for driving the cell electrode configuration, the driving unit being configured for carrying out at least the steps of:
(i) delivering at least one driving pulse to each group of cell electrodes in only one of the following orders:

a) first group of cell electrodes, third group of cell electrodes, second group of cell electrodes, fourth group of cell electrodes,
b) first group of cell electrodes, second group of cell electrodes, third group of cell electrodes, fourth group of cell electrodes,
c) any cyclic permutation and/or relabeling of cell electrode groups derivable from orders a) or b), (ii) repeating step (i) a predetermined number of times to laterally transport towards, and to confine in the confinement region of said cell, the scattering particles.

* * * * *